US 11,443,660 B2

(12) United States Patent
Pyo

(10) Patent No.: US 11,443,660 B2
(45) Date of Patent: Sep. 13, 2022

(54) DISPLAY DEVICE

(71) Applicant: LG ELECTRONICS INC., Seoul (KR)

(72) Inventor: Jonggil Pyo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/188,911

(22) Filed: Mar. 1, 2021

(65) Prior Publication Data

US 2021/0272484 A1    Sep. 2, 2021

(30) Foreign Application Priority Data

Feb. 28, 2020    (KR) ................ PCT/KR2020/002883

(51) Int. Cl.
  *G06F 1/16*    (2006.01)
  *G09F 9/30*    (2006.01)
  *G06F 1/18*    (2006.01)
(52) U.S. Cl.
  CPC .............. *G09F 9/301* (2013.01); *G06F 1/181* (2013.01)
(58) Field of Classification Search
  CPC .. G09F 9/301; G06F 1/181; G06F 2200/1612; G06F 1/1601; G06F 1/1624; G06F 1/1641; G06F 1/1652
  See application file for complete search history.

(56) References Cited

U.S. PATENT DOCUMENTS

| | | | | |
|---|---|---|---|---|
| 9,823,700 B2* | 11/2017 | Lee | ....................... | G06F 1/1652 |
| 11,029,733 B2* | 6/2021 | Lee | ....................... | G06F 1/1652 |
| 11,051,413 B2* | 6/2021 | Yang | ..................... | G06F 1/1626 |
| 11,100,818 B1* | 8/2021 | Feng | ..................... | G06F 1/1624 |
| 11,102,339 B2* | 8/2021 | Ahn | ........................ | G09F 9/301 |
| 11,137,801 B2* | 10/2021 | Park | ..................... | G06F 1/1635 |
| 2019/0371214 A1* | 12/2019 | Kim | .................. | H01L 51/0097 |
| 2021/0135492 A1* | 5/2021 | Kim | ..................... | H05K 5/0017 |
| 2021/0326569 A1* | 10/2021 | Song | ..................... | G06F 1/1681 |

FOREIGN PATENT DOCUMENTS

| | | | | | |
|---|---|---|---|---|---|
| KR | 20160081786 A | * | 7/2016 | | |
| KR | 20170123382 A | * | 11/2017 | .......... | H05K 5/0017 |

* cited by examiner

*Primary Examiner* — Rockshana D Chowdhury
(74) *Attorney, Agent, or Firm* — Lee, Hong, Degerman, Kang & Waimey PC

(57) ABSTRACT

A display device is disclosed. The display device includes: a flexible display panel; a roller extending in a longitudinal direction, wherein the flexible display panel is wound around or unwound from the roller; a first end of the roller rotatably coupled to a first frame; a second frame rotatably coupled to a second end of the roller and disposed opposite to the first frame with respect to the roller; a door disposed adjacent to an end of the flexible display panel unwound from the roller and coupled to the first frame and the second frame; and a side brake positioned between the door and the roller and the side brake is adjacent to the first frame when the door is closed, wherein the side brake restricts rotation of the roller.

11 Claims, 53 Drawing Sheets

DISPLAY DEVICE

CROSS-REFERENCE TO RELATED APPLICATION

Pursuant to 35 U.S.C. § 119 (a), this application claims the benefit of an earlier filing date and right of priority to International Application No. PCT/KR2020/002883 filed on Feb. 28, 2020, the contents of which are hereby incorporated by reference herein in its entirety.

BACKGROUND OF THE INVENTION

1. Field of the Invention

The present disclosure relates to a display device.

2. Description of the Related Art

With the development of the information society, demand for various kinds of display devices is increasing. In response to these needs, various kinds of display devices, such as LCDs (Liquid Crystal Display Devices), PDPs (Plasma Display Panels) and ELDs (Electro Luminescent Displays) and VFDs (Vacuum Fluorescent Displays) have been recently researched and used.

Among these, a display device using OLED (Organic Light-Emitting Diode) has an advantage in that the display device is excellent in brightness and viewing angle properties compared to an LCD device and does not require a backlight unit, thereby realizing an extremely slim device.

A flexible display panel is capable of being bent or rolled around a roller. Accordingly, it is possible to realize a display device, which is expanded from a roller and rolled around the roller, using the flexible display panel. Therefore, research on a structure capable of rolling a flexible display panel around a roller and unrolling the flexible display panel from the roller has been intensively conducted.

SUMMARY OF THE INVENTION

Therefore, the present disclosure has been made in view of the above problems, and it is an object of the present disclosure to provide a display device in which structural rigidity is ensured so as to prevent drooping of the display device.

Another object of the present disclosure is to provide a display device capable of ensuring structural rigidity for preventing twisting of the display device.

A further object of the present disclosure is to provide a display device including a structure for opening and closing for the display device.

Another further object of the present disclosure is to provide a display device capable of preventing drooping of the door of the display device.

Still another further object of the present disclosure is to provide a display device including a structure for holding the roller of the display device.

In accordance with an aspect of the present disclosure, the above and other objects can be accomplished by the provision of a display device including a flexible display panel, a roller extending in a longitudinal direction, wherein the flexible display panel is wound around or unwound from the roller, a first end of the roller rotatably coupled to a first frame, a second frame rotatably coupled to a second end of the roller and disposed opposite to the first frame with respect to the roller, a door disposed adjacent to an end of the flexible display panel unwound from the roller and coupled to the first frame and the second frame, and a side brake positioned between the door and the roller and the side brake is adjacent to the first frame when the door is closed, wherein the side brake restricts rotation of the roller.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Figure 1:
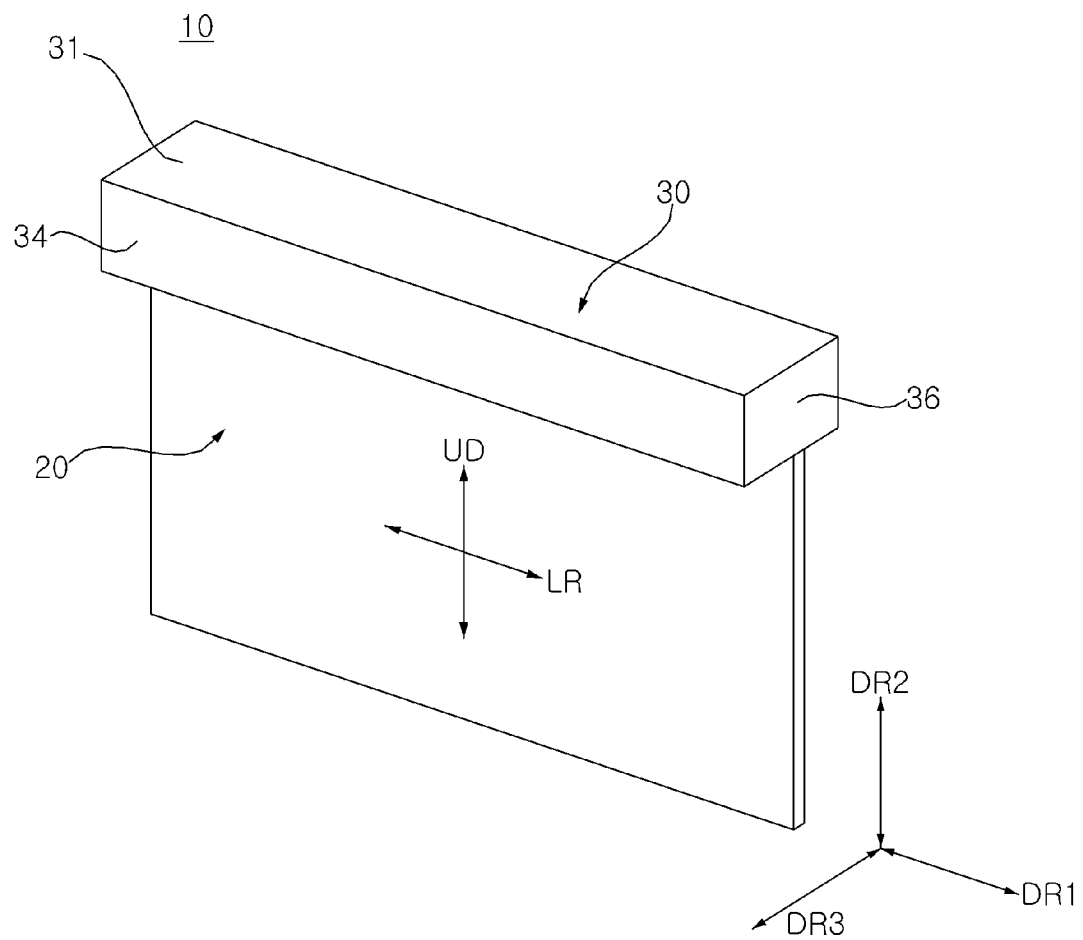
FIGS. 1 to 53 are views illustrating display devices according to embodiments of the present disclosure.

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In general, suffixes such as "module" and "unit" may be used to refer to elements or components. Use of such suffixes herein is merely intended to facilitate description of the specification, and the suffixes do not have any special meaning or function.

In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are only used to distinguish one element from another. It will be understood that when an element is referred to as being "connected with" another element, there may be intervening elements present. In contrast, it will be understood that when an element is referred to as being "directly connected with" another element, there are no intervening elements present.

A singular representation may include a plural representation unless context clearly indicates otherwise.

In the following description, even if an embodiment is described with reference to a specific figure, if necessary, reference numeral not shown in the specific figure may be referred to, and reference numeral not shown in the specific figure is used when the reference numeral is shown in the other figures.

Referring to FIG. 1, a display device 10 may include a display unit 20 and a housing 30. The housing 30 may have an internal space. At least a portion of the display unit 20 may be located inside the housing 30. At least a portion of the display unit 20 may be located outside the housing 30. The display unit 20 may display a screen.

The direction parallel to the longitudinal direction of the housing 30 may be referred to as a first direction DR1, a leftward direction, or a rightward direction. The direction in which the display unit 20 displays a screen may be referred to as a forward direction or the front. The direction opposite to the direction in which the display unit 20 displays the screen may be referred to as a rearward direction or the rear. The direction parallel to the height direction of the display device 10 may be referred to as a second direction DR2, an upward direction, or a downward direction.

A third direction DR3 may be a direction perpendicular to the first direction DR1 and/or the second direction DR2.

The first direction DR1 and the second direction DR2 may be collectively referred to as a horizontal direction. In addition, the third direction DR3 may be referred to as a vertical direction. A leftward-rightward direction LR may be parallel to the first direction DR1, and an upward-downward UD may be parallel to the second direction DR2.

Figure 2:
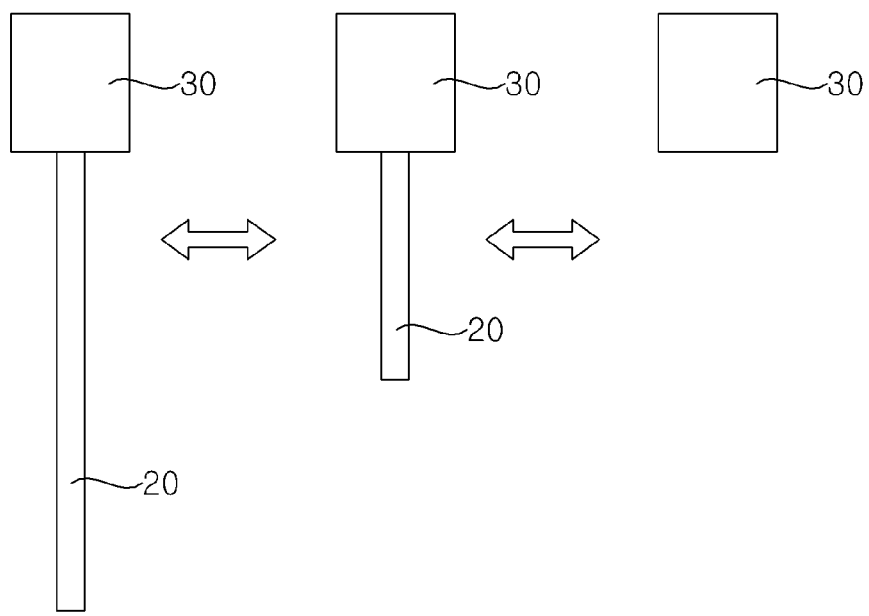

Referring to FIG. 2, the display unit 20 may be entirely located inside the housing 30. At least a portion of the display unit 20 may be located outside the housing 30. The degree to which the display unit 20 is exposed to the outside of the housing 30 may be adjusted as necessary.

Figure 3:
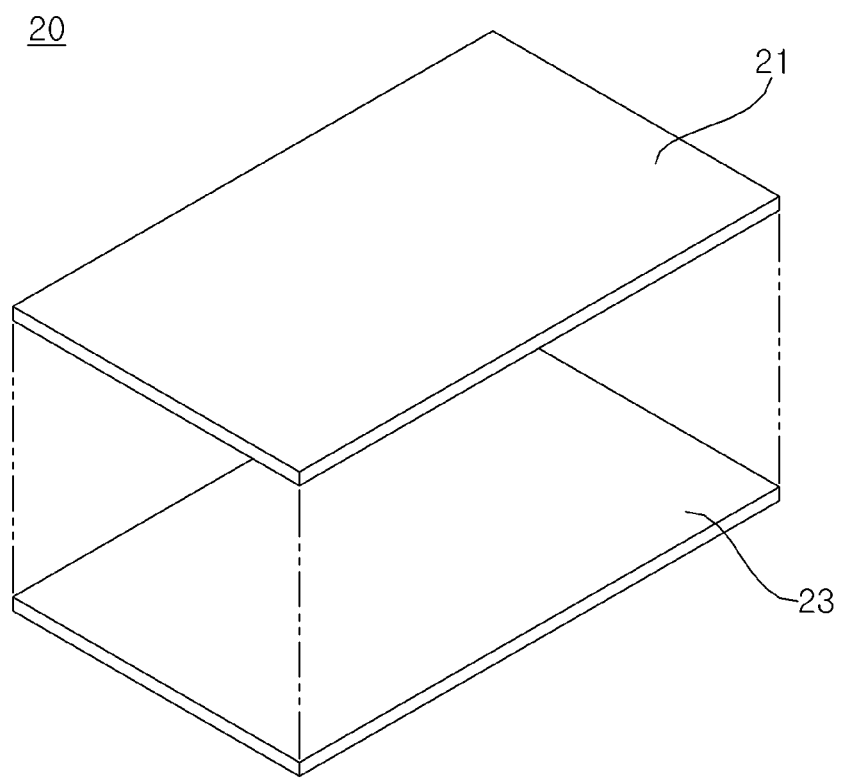

Referring to FIG. 3, the display unit 20 may include a display panel 21 and a plate 23. The display panel 21 may be flexible. For example, the display panel 21 may be an organic light emitting display (OLED).

The display panel 21 may have a front surface for displaying an image. The display panel 21 may have a rear surface facing the front surface. The front surface of the display panel 21 may be covered with a light transmissive material. For example, the light transmissive material may be a synthetic resin or film.

The plate 23 may be coupled, fastened, or attached to the rear surface of the display panel 21. The plate 23 may include a metal material. The plate 23 may be referred to as a module cover 23, a cover 23, a display panel cover 23, a panel cover 23, or an apron 23.

Figure 4:
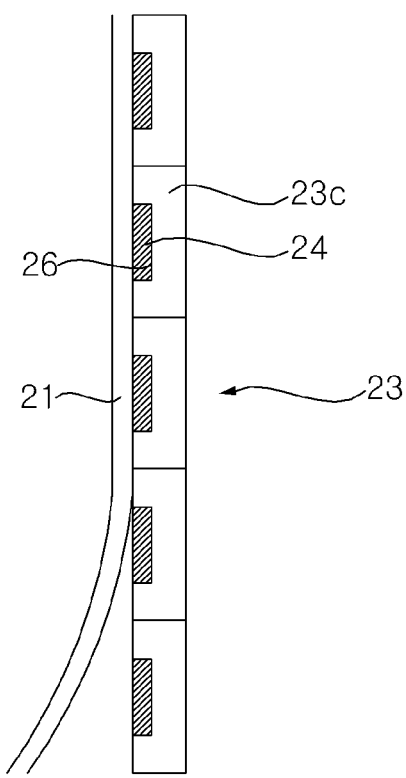

Referring to FIG. 4, the plate 23 may include a plurality of segments 23c. A magnet 24 may be located inside a recess 26 of the segment 15c. The recess 26 may be located on a surface of the segment 23c facing the display panel 21. The recess 26 may be located in the front surface of each segment 23. Since the magnet 24 is accommodated inside the recess 26, the magnet 24 may not protrude from the segment 23c. The display panel 21 may be flat without being wrinkled even when it is in contact with the segment 23c.

Figure 5:
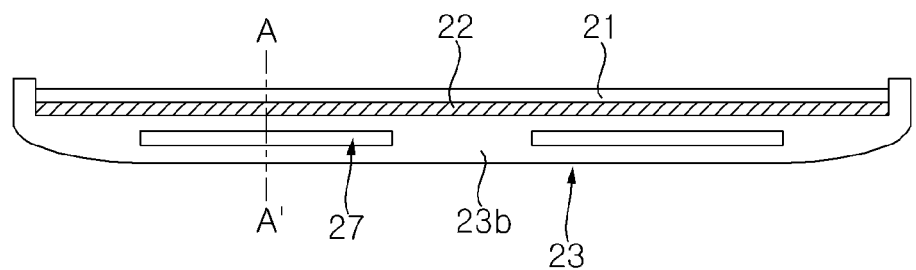
Figure 5:
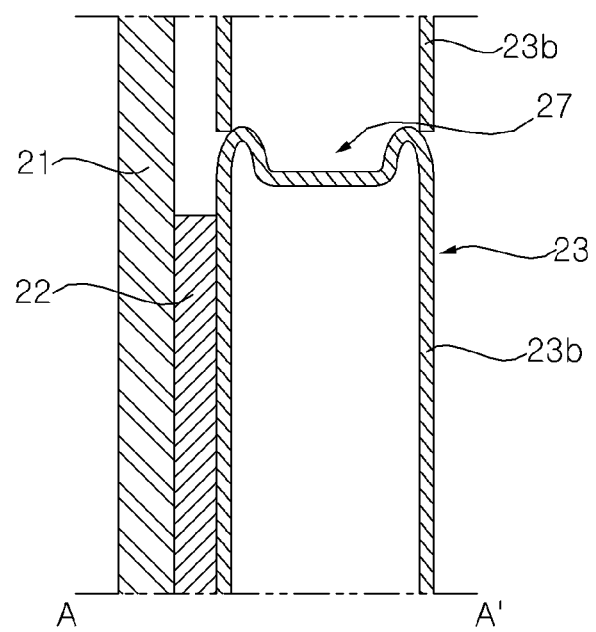

Referring to FIG. 5, a bead 27 may be formed in the upper surface of the segment 23b. The bead 27 may have a shape recessed inwardly of the segment 23b. For example, the bead 27 may be formed by pressing the segment 23b. A plurality of beads 27 may be formed on the segment 23b. The plurality of beads 27 may be spaced apart from each other. The bead 27 may enhance the rigidity of the segment 23b. The bead 27 can prevent the shape of the segment 23b from being deformed due to external impact. The segment 23b may be fixed to the rear of the display panel 21 via an adhesive member 22. For example, the adhesive member 22 may be double-sided tape.

Figure 6:
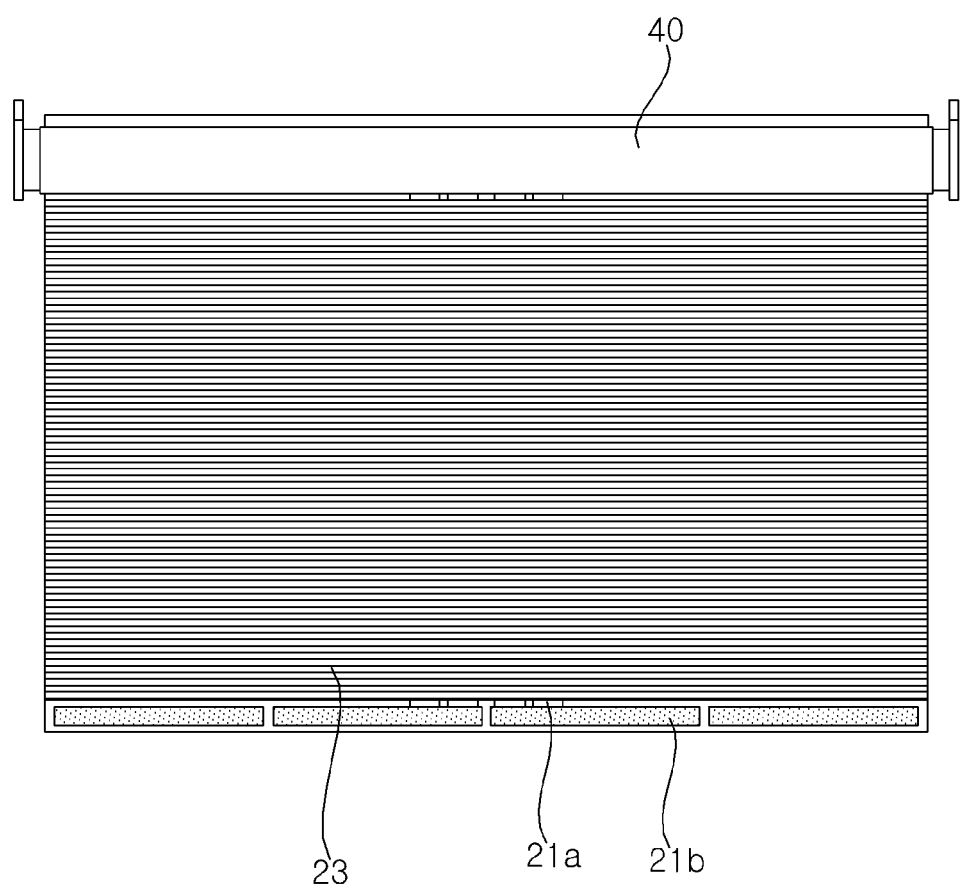

Referring to FIG. 6, a source PCB 21b may be located under the module cover 23. In the case of roll-down or roll-up, the position of the source PCB 21b may be changed with the movement of the module cover 23. An FFC cable 21a may be located in the central part of the module cover 23 based on the first direction. The FFC cable 21a may be located in both ends of the module cover 23 based on the first direction.

Figure 7:
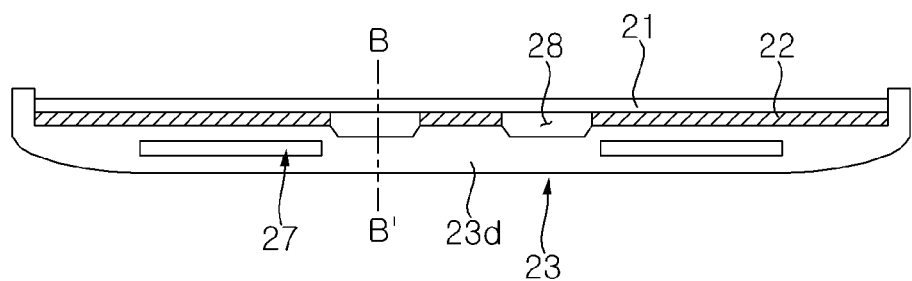
Figure 7:
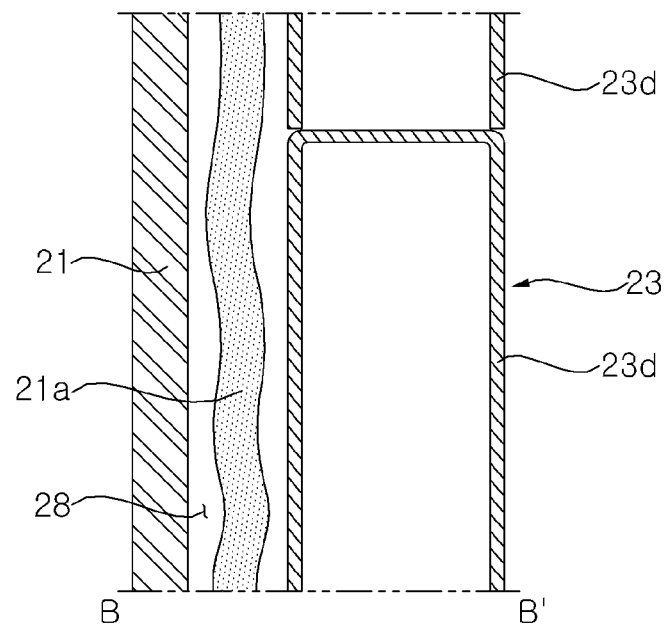

Referring to FIG. 7, a segment 23d may include a depression 28 recessed inwardly of the segment 23d. The depression 28 may form a space between the display panel 21 and the module cover 23. The FFC cable 21a may be accommodated in a space formed by the depression 28. In addition, the depression 28 may improve the rigidity of the segment 23d.

The bead 27 may be located on the segment 23d excluding a portion where the depression 28 is located. The position of the depression 28 may not overlap the position of the bead 27 in order to prevent a reduction in rigidity of the segment 23d.

Figure 8:
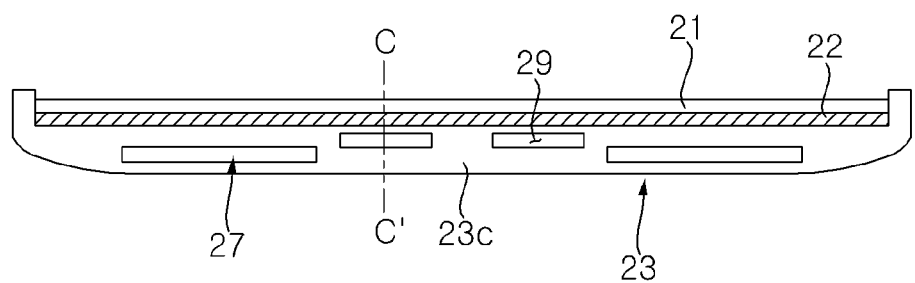
Figure 8:
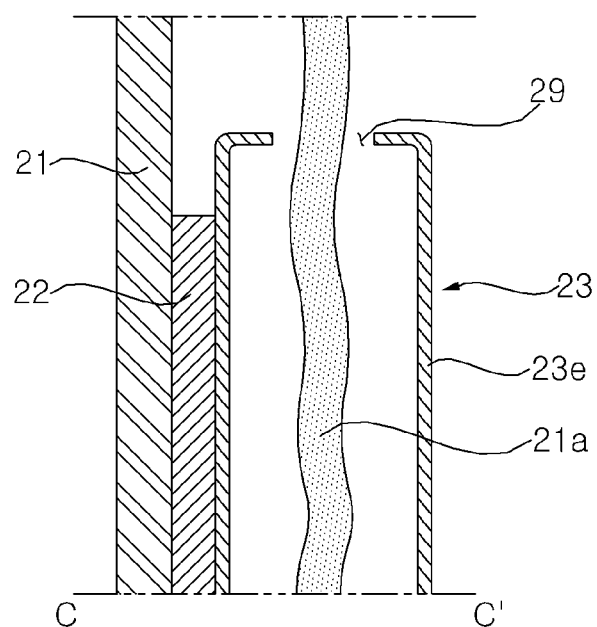

Referring to FIG. 8, a penetrating portion 29 may be located at the central part of a segment 23e based on the first direction. The penetrating portion 29 may penetrate the central part of the segment 23e in the second direction. That is, the penetrating portion 29 may be a hole located in the segment 23e. The penetrating portion 29 may be a portion where the FFC cable 21a is located. Since the penetrating portion 29 is formed in the segment 23e, the thickness of the segment 23e may be reduced in comparison with the case where the FFC cable 21a is located in the depression 28 (see FIG. 7).

The bead 27 may be located on the segment 23e excluding a portion where the penetrating portion 29 is located. The position of the penetrating portion 29 may not overlap the position of the bead 27 in order to prevent a reduction in rigidity of the segment 23e.

Figure 9:
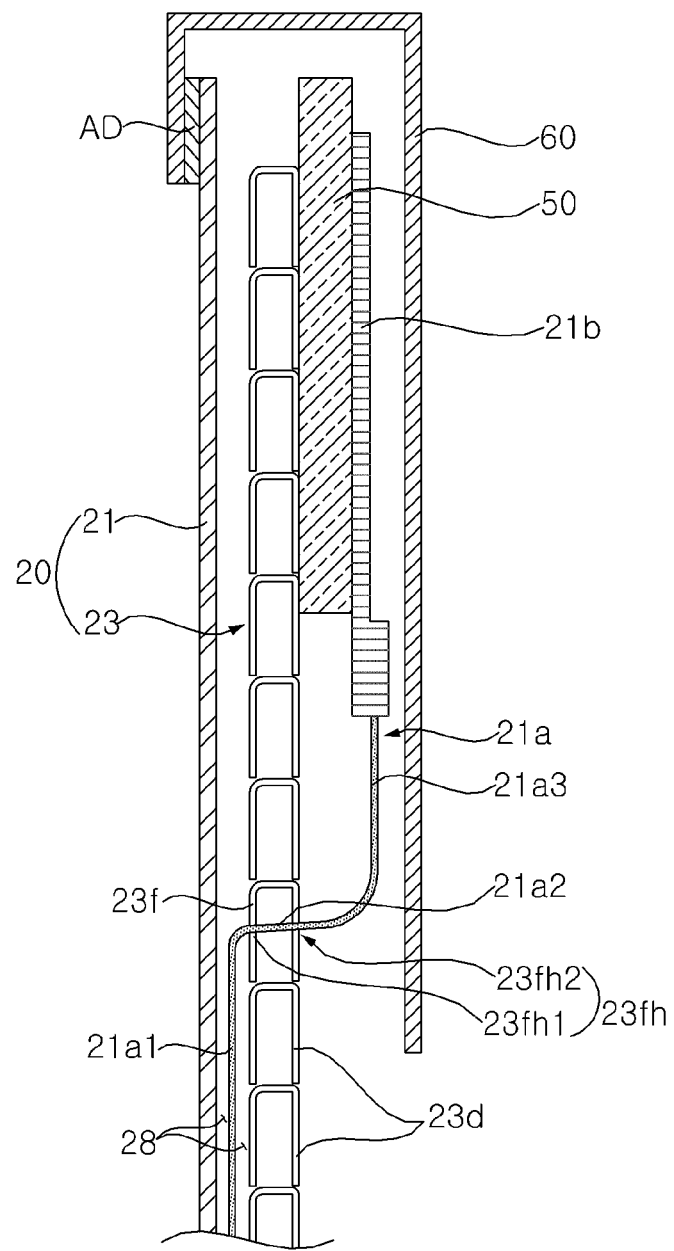

Referring to FIG. 9, a top case 60 may cover the source PCB 21b and an upper bar 50 as well as the display panel 21 and the module cover 23. One surface of the upper bar 50 may be coupled to the rear surface of the module cover 23, and the other surface thereof may be coupled to the source PCB 21b. The upper bar 50 may be fixed to the module cover 23 to support the source PCB 21b. The top case 60 may be referred to as a bottom case 60. The upper bar 50 may be referred to as a lower bar 50.

Figure 10:
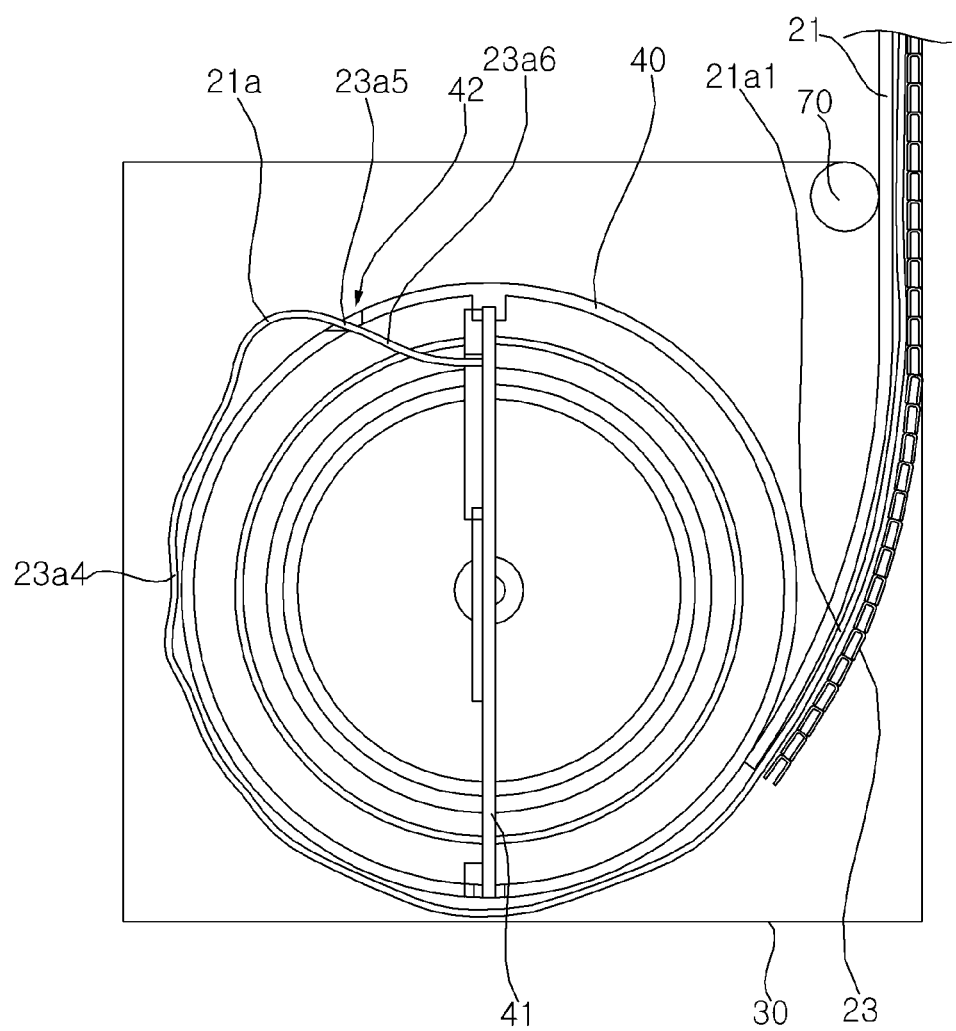

The lower end of the FFC cable 21a may be connected to a timing controller board 41 (see FIG. 10) inside a panel roller 40 (see FIG. 10). The FFC cable 21a may be wound around or unwound from the panel roller 40 together with the display unit 20.

A portion of the FFC cable 21a may be located between the display panel 21 and the module cover 23. The portion of the FFC cable 21a located between the display panel 21 and the module cover 23 may be referred to as a first portion 21a1. The first portion 21a1 may be located in the depression 28 formed by the plurality of segments 23d. Alternatively, the first portion 21a1 may be accommodated in the depression 28 formed by the plurality of segments 23d.

A portion of the FFC cable 21a may penetrate a segment 23f. The portion of the FFC cable 21a that passes through the segment 23f may be referred to as a second portion 21a2. The segment 23f may include a first hole 23fh1 formed in the front surface and a second hole 23fh2 formed in the rear surface. The first hole 23fh1 and the second hole 23fh2 may be connected to each other to form a single hole 23fh. The hole 23fh may penetrate the segment 23f in the third direction. The second portion 21a2 may extend through the hole 23fh. The hole 23fh may be referred to as a connection hole 23fh.

The upper end of the FFC cable 21a may be electrically connected to the source PCB 21b. A part of the FFC cable 21a may be located in the rear surface of the module cover 23. The portion of the FFC cable 21a located in the rear surface of the module cover 23 may be referred to as a third portion 21a3. The third portion 21a3 may be electrically connected to the source PCB 21b.

The third portion 21a3 may be covered by the top case 60. Accordingly, the third portion 21a3 may not be exposed to the outside.

Referring to FIG. 10, the FFC cable 21a may be connected to the timing controller board 41 mounted in the panel roller 40. A penetrating hole 42 may be formed on the panel roller 40, and the FFC cable 21a may be connected to the timing controller board 41 through the penetrating hole 42.

The penetrating hole 42 may be located in one side of the panel roller 40 and may penetrate an outer circumferential portion of the panel roller 40. The FFC cable 21a may be connected to one side of the timing controller board 41 through the penetrating hole 42.

Even when the FFC cable 21a is located in the outer circumference of the panel roller 40, it may maintain the connection with the timing controller board 41 due to the penetrating hole 42. Accordingly, the FFC cable 21a may rotate together with the panel roller 40 to prevent twisting.

A portion of the FFC cable 21a may be wound around the panel roller 40. The portion of the FFC cable 21a wound around the panel roller 40 may be referred to as a fourth portion 23a4. The fourth portion 23a4 may be in contact with the outer circumferential surface of the panel roller 40.

A portion of the FFC cable 21a may pass through the penetrating hole 42. The portion of the FFC cable 21a passing through the penetrating hole 42 may be referred to as a fifth portion 23a5.

The lower end of the FFC cable 21a may be electrically connected to the timing controller board 41. A portion of the FFC cable 21a may be located inside the panel roller 40. The portion of the FFC cable 21a located inside the panel roller 40 may be referred to as a sixth portion 23a6. The sixth portion 23a6 may be electrically connected to the timing controller board 41.

Figure 11:
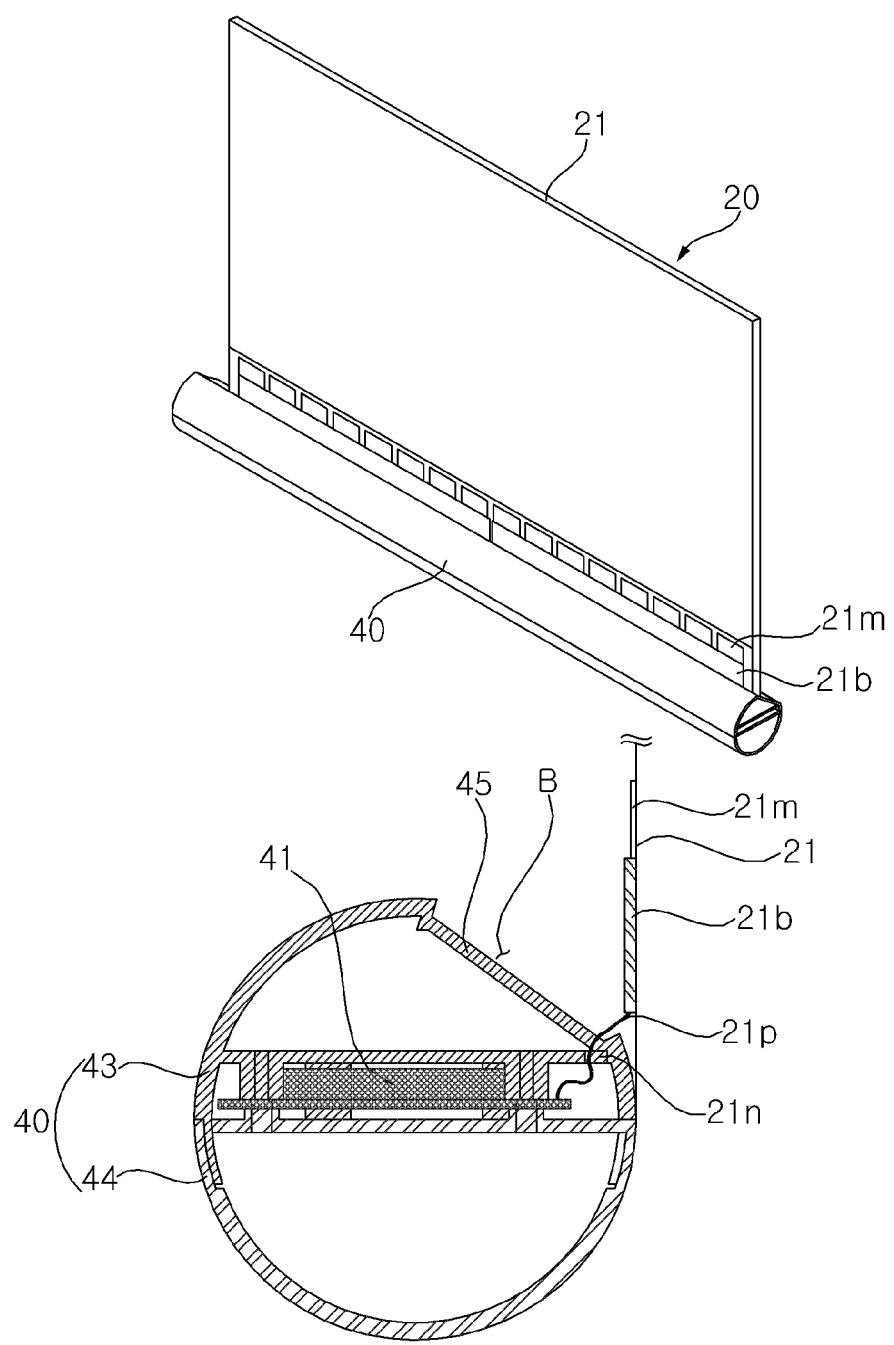

Referring to FIG. 11, the display panel 21 may be connected to the panel roller 40. The display panel 21 may be wound around or unwound from the panel roller 40. The display panel 21 may be electrically connected to the plurality of source PCBs 21b. The plurality of source PCBs 21b may be spaced apart from each other.

A source chip on film (COF) 21m may connect the display panel 21 and the source PCB 21b. The source COF 21M may be located at the lower side of the display panel 21. The panel roller 40 may include a first part 43 and a second part 44. The first part 43 and the second part 44 may be fastened by a screw. The timing controller board 41 may be mounted in the panel roller 40.

The source PCB 21b may be electrically connected to the timing controller board 41. The timing controller board 41 may send digital video data and a timing control signal to the source PCB 21b.

The cable 21p may electrically connect the source PCB 21b and the timing controller board 41. For example, the cable 21p may be a flexible flat cable (FFC). The cable 21p may penetrate a hole 21n. The hole 21n may be formed in a seating portion 45 or the first part 43. The cable 21p may be located between the display panel 21 and the second part 44.

The seating portion 45 may be formed in an outer circumference of the first part 43. The seating portion 45 may be formed by stepping a portion of the outer circumference of the first part 43. The seating portion 45 may form a space B. When the display unit 20 is wound around the panel roller 40, the source PCB 21b may be accommodated in the seating portion 45. Since the source PCB 21b is accommodated in the seating portion 45, the source PCB 21b may not be twisted or bent, and durability may be improved.

Figure 12:
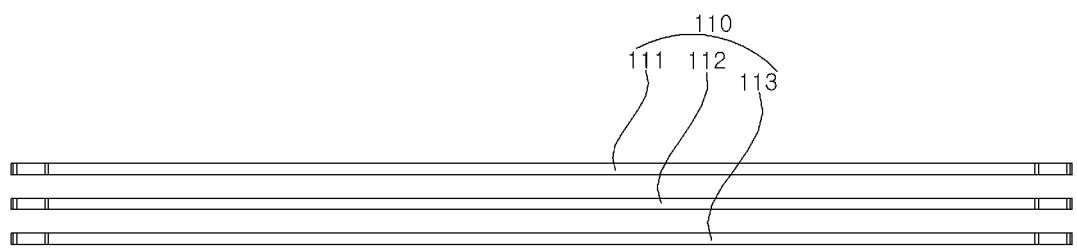
Figure 13:
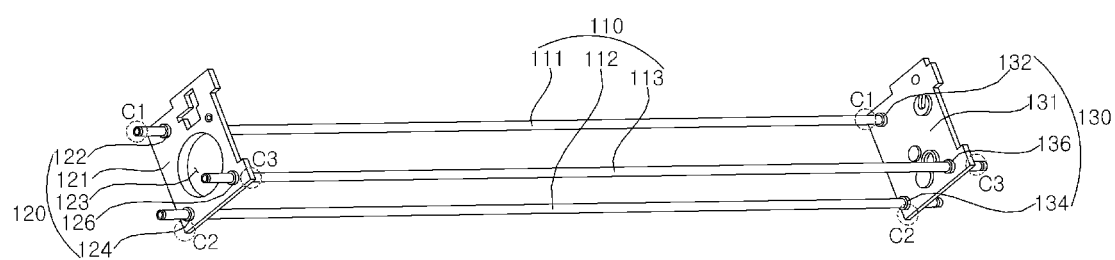

Referring to FIGS. 12 and 13, a pipe 110 may extend long in the leftward-rightward direction. A plurality of pipes 110 may be provided. The plurality of pipes 110 may include a first pipe 111, a second pipe 112, and a third pipe 113. The plurality of pipes 110 may be parallel to each other. For example, each pipe 110 may be a hollow cylinder. As another example, each pipe 110 may be a cylindrical bar.

The pipes 110 may be inserted through frames 120 and 130 so as to be coupled to the frames 120 and 130. The frames 120 and 130 may include a first frame 120 and a second frame 130. The first frame 120 may be located adjacent to one end of each pipe 110, and the second frame 130 may be located adjacent to the other end of each pipe 110. The first frame 120 may face the second frame 130.

For example, each of the frames 120 and 130 may be a quadrangular plate. The first pipe 111 may be inserted through the frames 120 and 130 in the state of being adjacent to a first corner Cl of each of the first frame 120 and the second frame 130. The second pipe 112 may be inserted through the frames 120 and 130 in the state of being adjacent to a second corner C2 of each of the first frame 120 and the second frame 130. The third pipe 113 may be inserted through the frames 120 and 130 in the state of being adjacent to a third corner C3 of each of the first frame 120 and the second frame 130.

A center opening 123 may be formed in a plate 121 of the first frame 120. The center opening 123 may be a circle formed through the plate 121 of the first frame 120. The first pipe 111, the second pipe 112, and the third pipe 113 may be disposed while forming a triangle with respect to the center opening 123.

Referring to FIG. 13, coupling ports 122, 124, 126, 132, 134, and 136 may be formed in plates 121 and 131. The first frame 120 may include an 11th coupling port 122, a 12th coupling port 124, and a 13th coupling port 126. The second frame 130 may include a 21st coupling port 132, a 22nd coupling port 134, and a 23rd coupling port 136. The first pipe 111 may be inserted through the 11th coupling port 122 and the 21st coupling port 132. The second pipe 112 may be inserted through the 12th coupling port 124 and the 22nd coupling port 134. The third pipe 113 may be inserted through the 13th coupling port 126 and the 23rd coupling port 136. The coupling ports 122, 124, 126, 132, 134, and 136 may be referred to as intermediate couplers 122, 124, 126, 132, 134, and 136.

Figure 14:
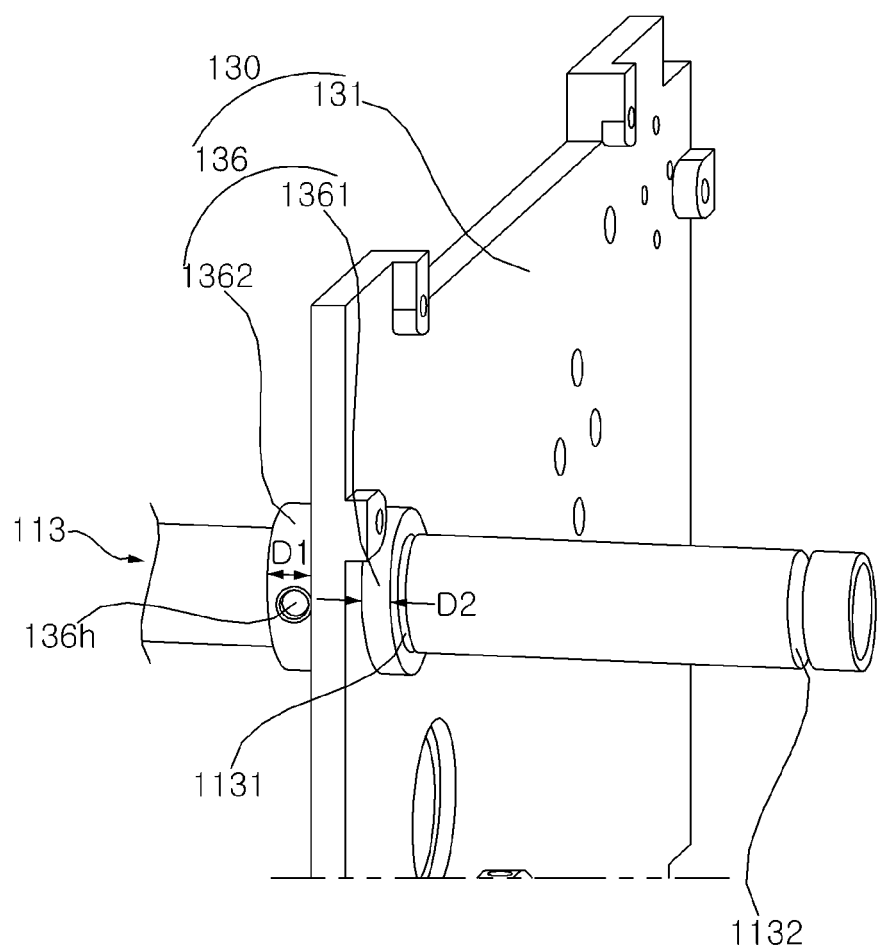
Figure 15:
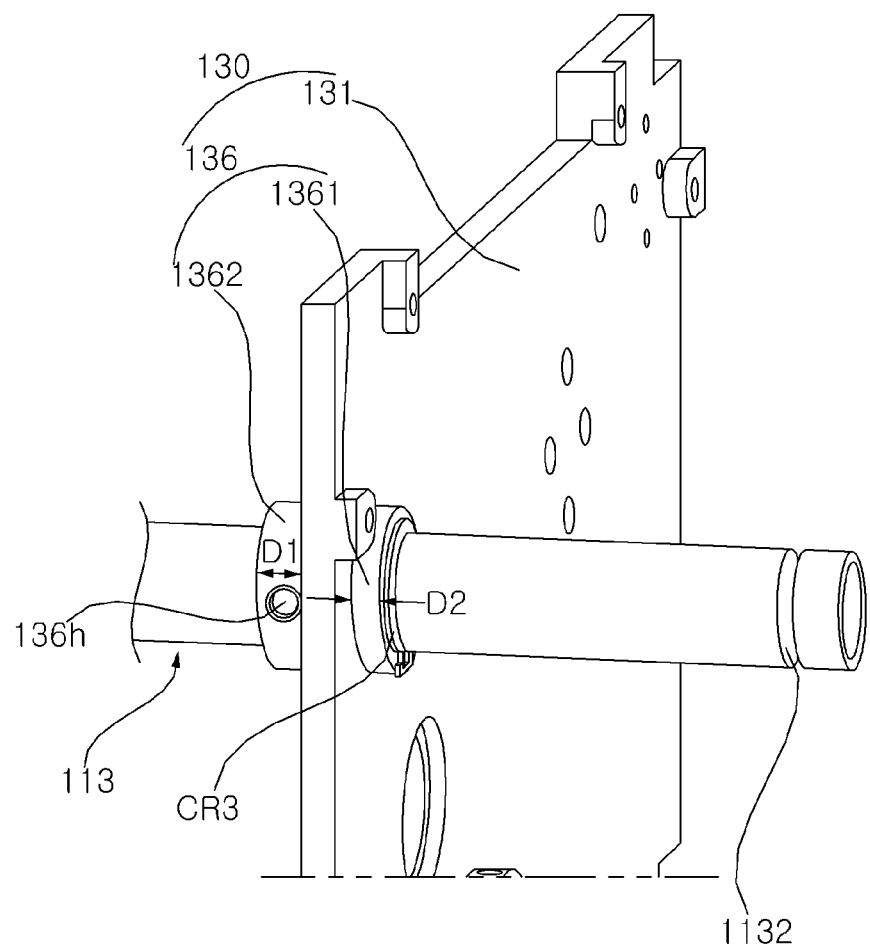
Figure 16:
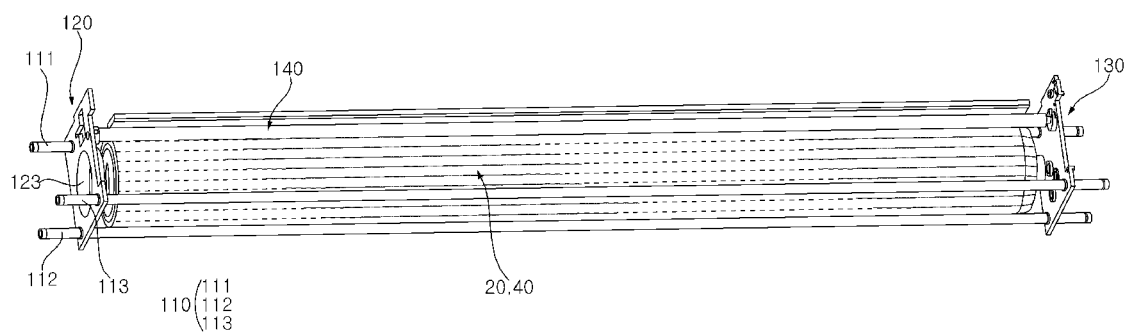
Figure 17:
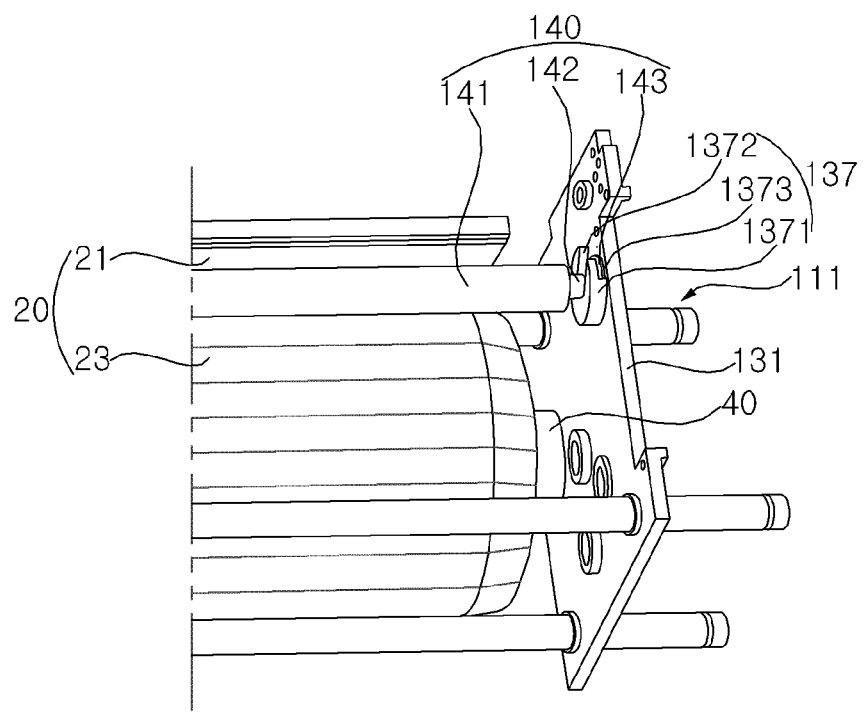
Figure 18:
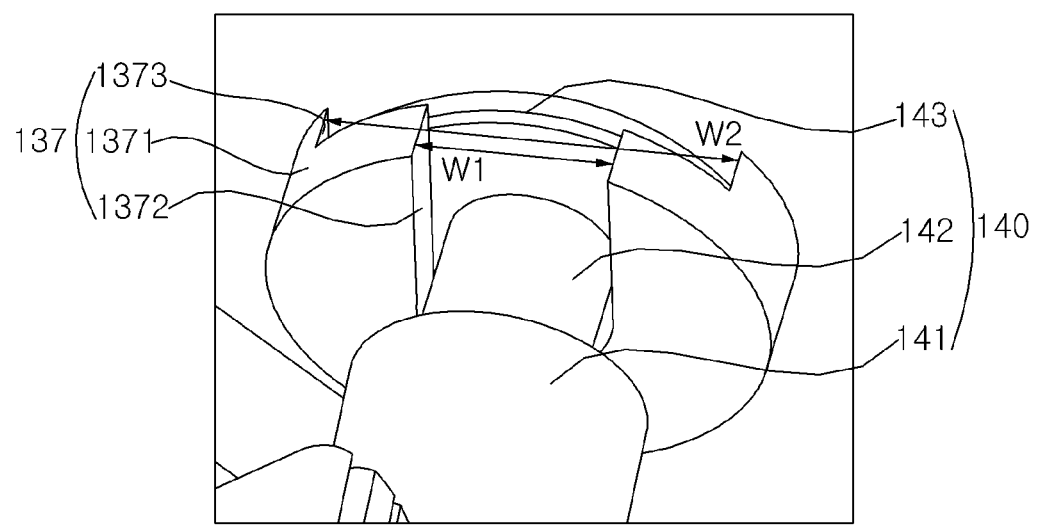
Figure 19:
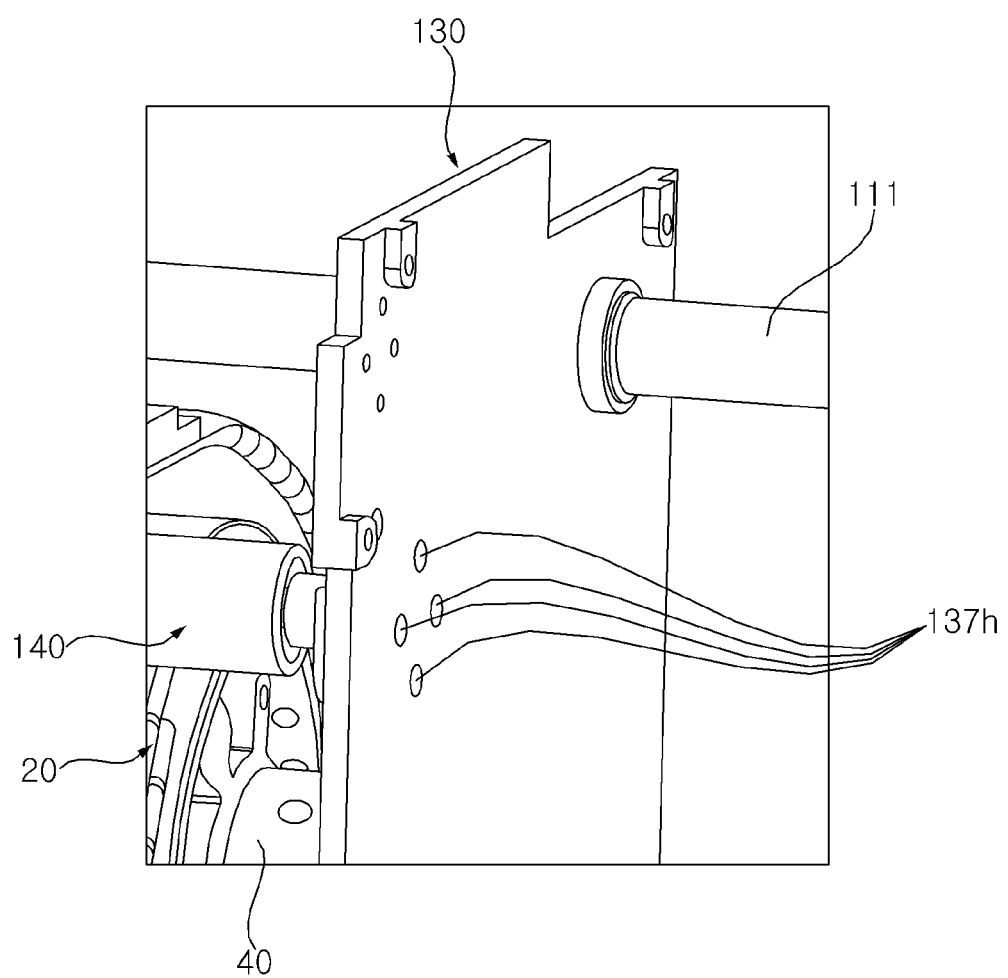

Referring to FIGS. 14 and 15, the coupling port 136 may have a cylindrical shape formed through the plate 131. The coupling port 136 may be fixed to the plate 131, or may be formed integrally with the plate 131. The coupling port 136 may have an outside 1361 and an inside 1362 with respect to the plate 131. The distance D2 of the outside 1361 may be less than the distance D1 of the inside 1362. A fastening hole 136h may be formed in the inside 1362. A screw may be fastened to the fastening hole 136h, whereby the pipe 113 may be fixed to the frame 130.

A first neck 1131 may be recessed inwardly of the pipe 113 in the state of being adjacent to the outside 1361 of the coupling port 136 to form an engraved ring in the outer surface of the pipe 113. A second neck 1132 may be recessed inwardly of the pipe 113 in the state of being spaced apart from the distal end of the pipe 113 while being adjacent to the distal end of the pipe 113 to form an engraved ring in the outer surface of the pipe 113. A coupling ring CR3 may be fastened to the first neck 1131, whereby the pipe 113 may be securely fixed to the frame 130. For example, the coupling ring CR3 may be an E ring.

Referring to FIGS. 16 to 19, the display unit 20 wound around the panel roller 40 may be inserted between the first pipe 111, the second pipe 112, the third pipe 113, the first frame 120, and/or the second frame 130. The panel roller 40 may be disposed parallel to the first pipe 111, the second pipe 112, or the third pipe 113.

A guide roller 140 may be coupled to the frames 120 and 130 in the state in which the panel roller 40 and the display unit 20 are located between the pipes 110 and the frames 120 and 130. The guide roller 140 may have a shaft 142, a roller 141, and a fixing plate 143.

A support 137 may be formed at the plate 131. The support 137 may support the shaft 142 of the guide roller 140. The shaft 142 is fixed to the support 137, and the guide roller 140 may be rotated on the shaft 142. The support 137 may be formed inside the plate 131.

The support 137 may include a body 1371, a shaft recess 1372, and a plate recess 1373. The body 1371 may have a cylindrical shape protruding from the inner surface of the plate 131. The shaft recess 1372 may be recessed inwardly of the body 1371 from the outer circumferential surface of the body 1371. The plate recess 1373 may be recessed inwardly of the body 1371 from the outer circumferential surface of the body 1371 between the shaft recess 1372 and the plate 131. The recess width W2 of the plate recess 1373 may be greater than the recess width W1 of the shaft recess 1372.

In other words, the shaft recess 1372 may have a recess width W1 corresponding to the diameter of the shaft 142, and the plate recess 1373 may have a recess width W2 corresponding to the diameter of the fixing plate 143. The shaft 142 of the guide roller 140 is inserted into the shaft recess 1372 of the support 137, and the fixing plate 143 of the guide roller 140 is inserted into the plate recess 1373 of the support 137, whereby the guide roller 140 may be supported by the support 137.

Figure 21:
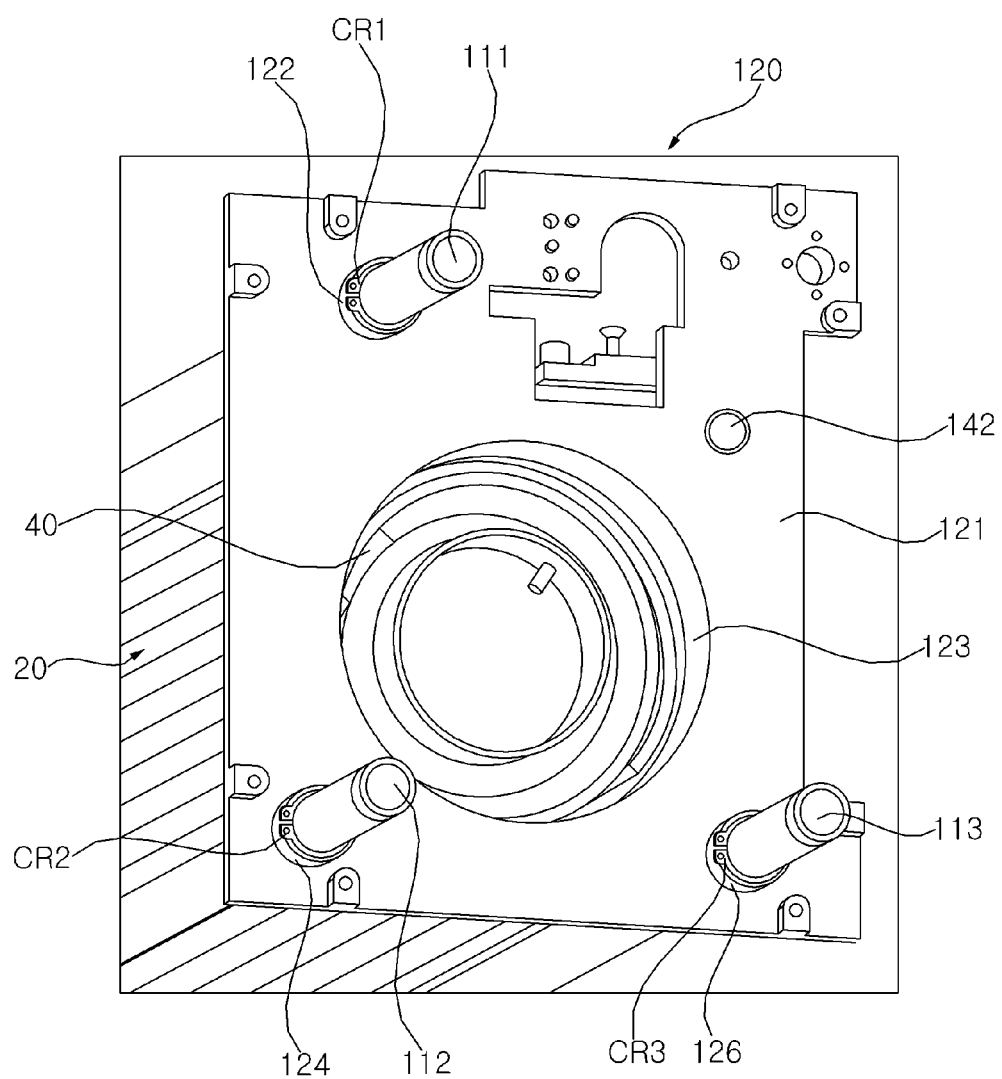
Figure 22:
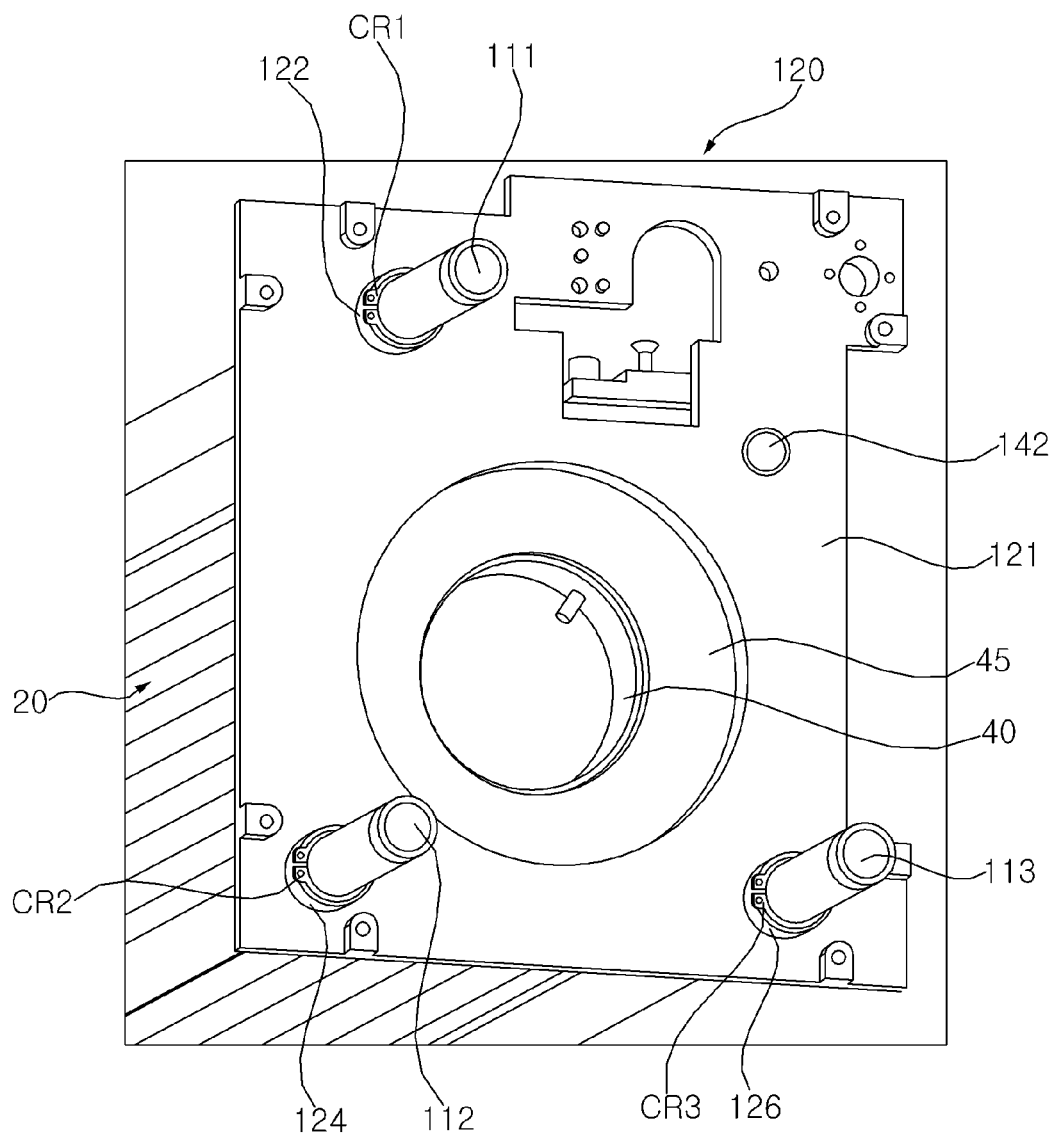

The fixing plate 143 may be fixed to the frame 130 via fastening members (e.g. screws) fastened to fastening holes 137h formed through the frame 130. Referring to FIG. 21, the shaft 142 may be inserted into and fixed to the frame 120.

Figure 20:
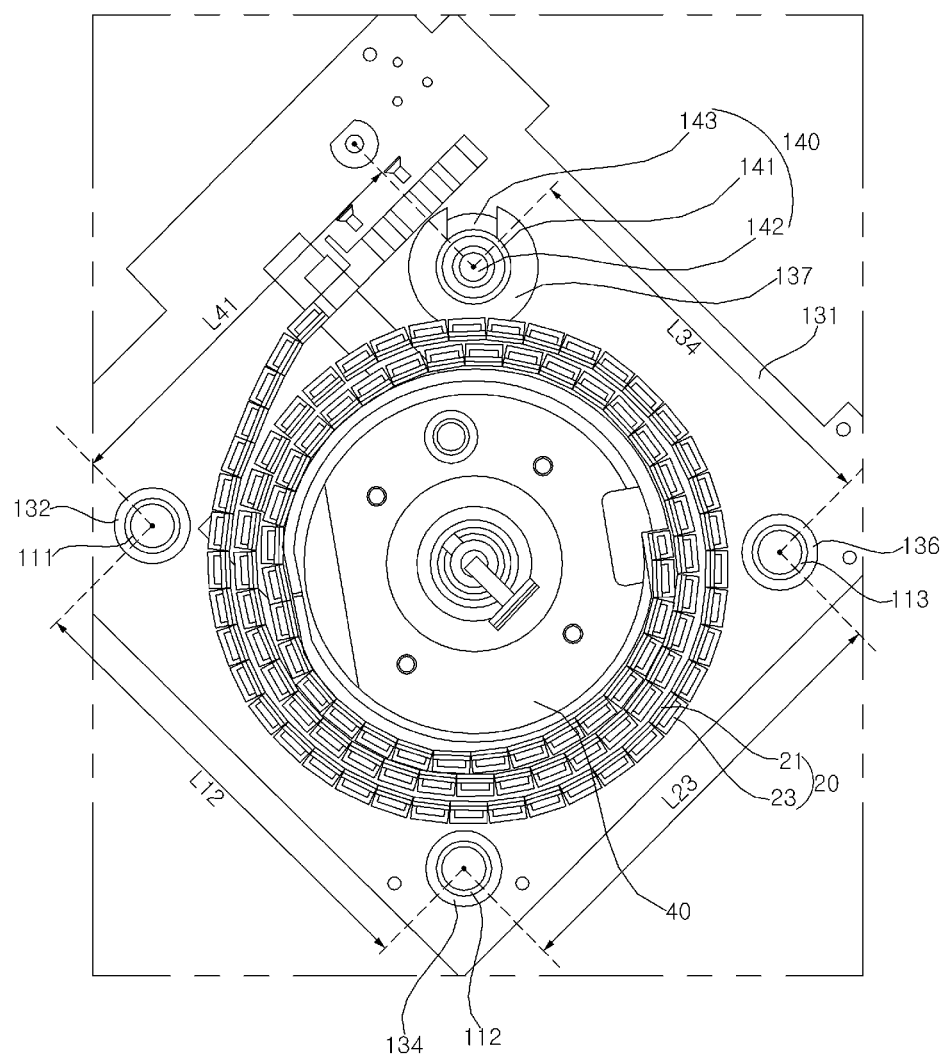

Referring to FIG. 20, the distance L12 between the first pipe 111 and the second pipe 112 may be greater than the distance L23 between the second pipe 112 and the third pipe 113. The distance L12 between the first pipe 111 and the second pipe 112 may be greater than the distance L34 between the third pipe 113 and the guide roller 140. The distance L12 between the first pipe 111 and the second pipe 112 may be greater than the distance L41 between the first pipe 111 and the guide roller 140. The distance L23 between the second pipe 112 and the third pipe 113 may be greater than the distance L41 between the first pipe 111 and the guide roller 140. The distance L23 between the second pipe 112 and the third pipe 113 may be greater than the distance L34 between the third pipe 113 and the guide roller 140. The distance L34 between the third pipe 113 and the guide roller 140 may be greater than the distance L41 between the guide roller 140 and the first pipe 111. Consequently, it is possible to improve twisting rigidity as well as drooping rigidity of the display device.

Referring to FIGS. 21 to 24, one end of the panel roller 40 may be located adjacent to the center opening 123 of the first frame 120. A rotary shaft of the panel roller 40 may be aligned with the center of the center opening 123 of the first frame 120. A bearing 45 may be mounted in the center opening 123 of the first frame 120. For example, the bearing 45 may be a ring bearing 45. One end of the panel roller 40 may be inserted into or forcibly fitted into the bearing 45. The other end of the panel roller 40 may be rotatably coupled to the second frame 130. The panel roller 40 may have a rotary shaft 46, and the rotary shaft 46 may be installed at the second frame 130 through the first frame 130. The rotary shaft 46 may be connected to the lever 47, and the panel roller 40 may be manually rotated through the lever 47.

The coupling port 136 may have a cylindrical shape formed through the plate 131. The coupling port 136 may be fixed to the plate 131, or may be formed integrally with the plate 131. The coupling port 136 may have an outside 1361 and an inside 1362 with respect to the plate 131. The distance D2 of the outside 1361 may be less than the distance D1 of the inside 1362. For example, the distance D1 of the inside 1362 may be five or more times of the distance D2 of the outside 1361.

The pipes 112 and 113 may be forcibly fitted into outsides 1341 and 1361 through insides 1342 and 1362 of the coupling ports 134 and 136. The pipes 112 and 113 may not extend through the coupling ports 134 and 136. The outsides 1341 and 1361 of the coupling ports 134 and 136 may cover the distal ends of the pipes 112 and 113. A first fastening hole 136h1 and a second fastening hole 136h2 may be formed in the inside 1362. Screws may be fastened to the first fastening hole 136h1 and the second fastening hole 136h2, whereby the pipe 113 may be securely fixed to the frame 130.

Figure 25:
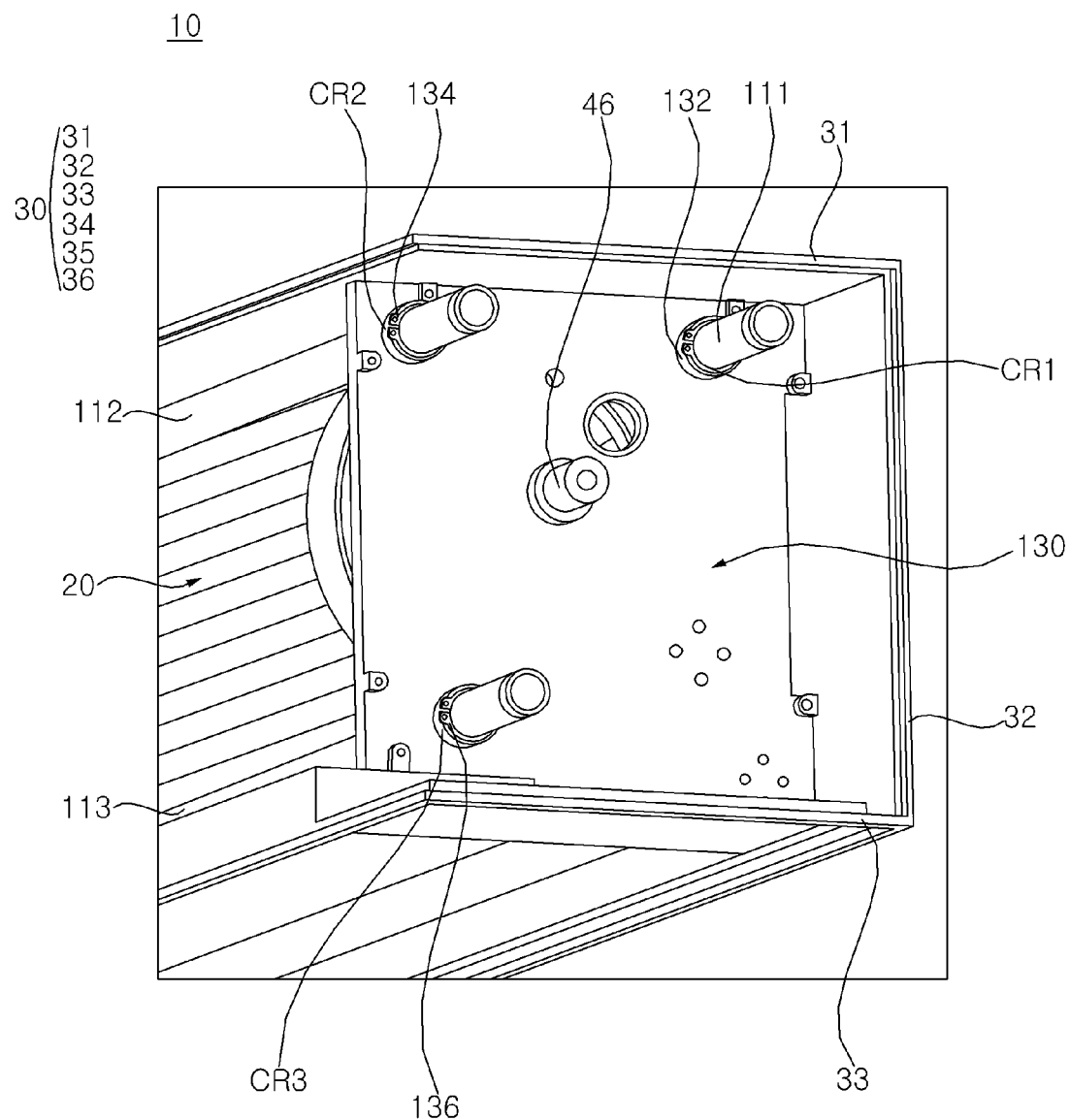

Referring to FIG. 25, the housing 30 may include an upper plate 31, a lower plate 33, a front plate 34 (see FIG. 1), and a rear plate 32. The upper plate 31 may be coupled to the first frame 120 and the second frame 130 while covering the first pipe 111 and the second pipe 112. The front plate 34 may be coupled to the first frame 120 and the second frame 130 while covering the second pipe 112 and the third pipe 113. The rear plate 32 may be coupled to the first frame 120 and the second frame 130 while covering the first pipe 111 and the guide roller 140. The lower plate 33 may be coupled to the first frame 120 and the second frame 130 while covering the third pipe 113 and the guide roller 140. The lower plate 33 may be a door.

Figure 26:
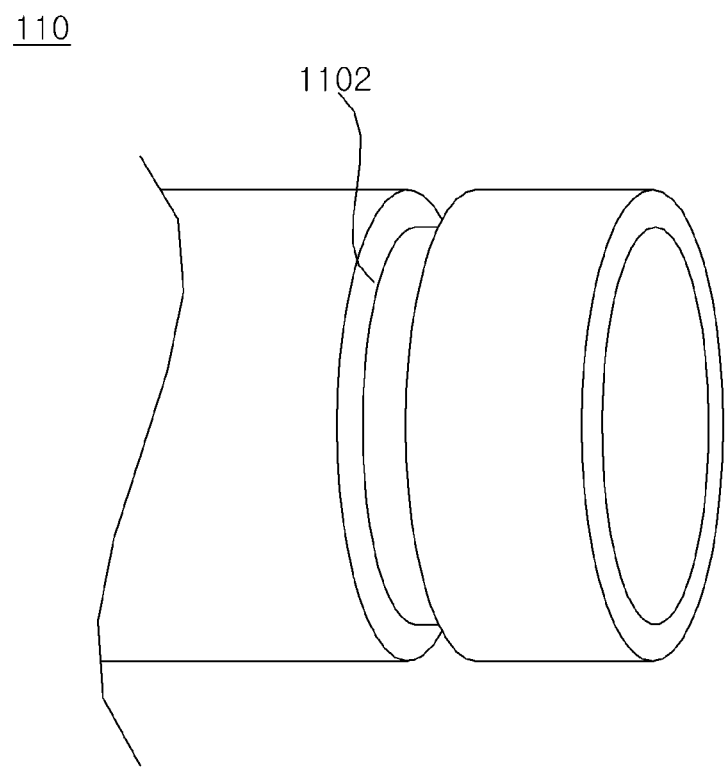
Figure 27:
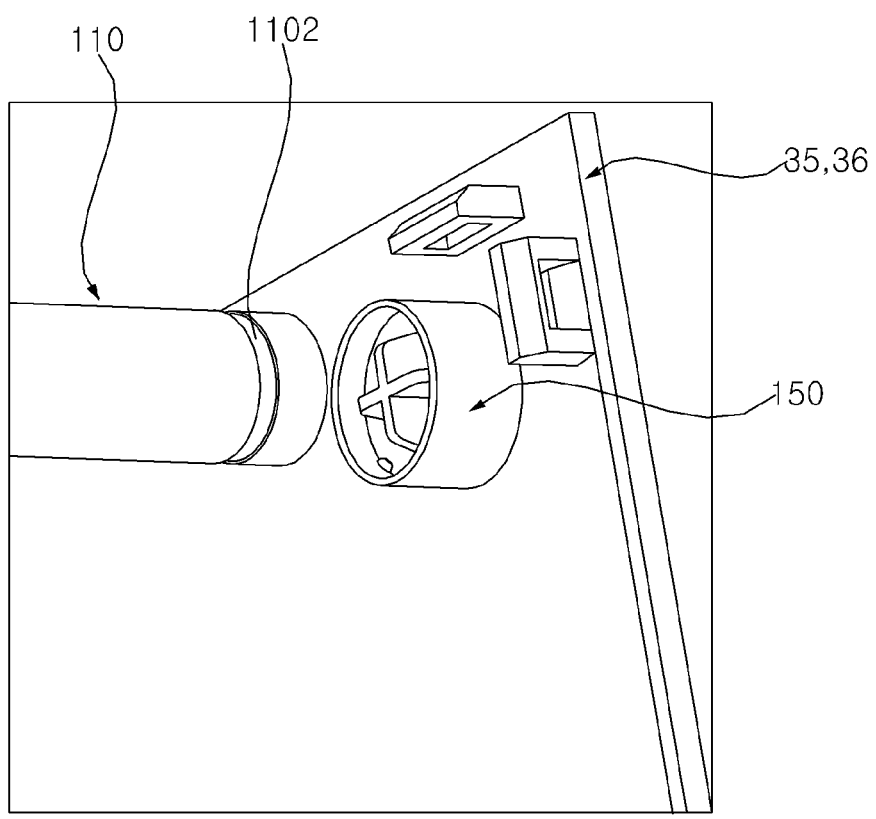

Referring to FIGS. 26 and 27, the pipe 110 may have a neck 1102 located adjacent to the distal end thereof, the neck 1102 being formed at the outer circumferential surface of the pipe 110. The neck 1102 may be the second neck 1132 described with reference to FIGS. 14 and 15. The description of the pipe 110 may be applied to the first pipe 111, the second pipe 112, and the third pipe 113.

The pipe 110 may be coupled to side covers 35 and 36. A coupling port 150 may be formed inside each of the side covers 35 and 36. The pipe 110 may be inserted or forcibly fitted into the coupling ports 150, whereby the pipe 110 may be fixed to the side covers 35 and 36. The coupling port 150 may be referred to as an end coupler 150.

Figure 28:
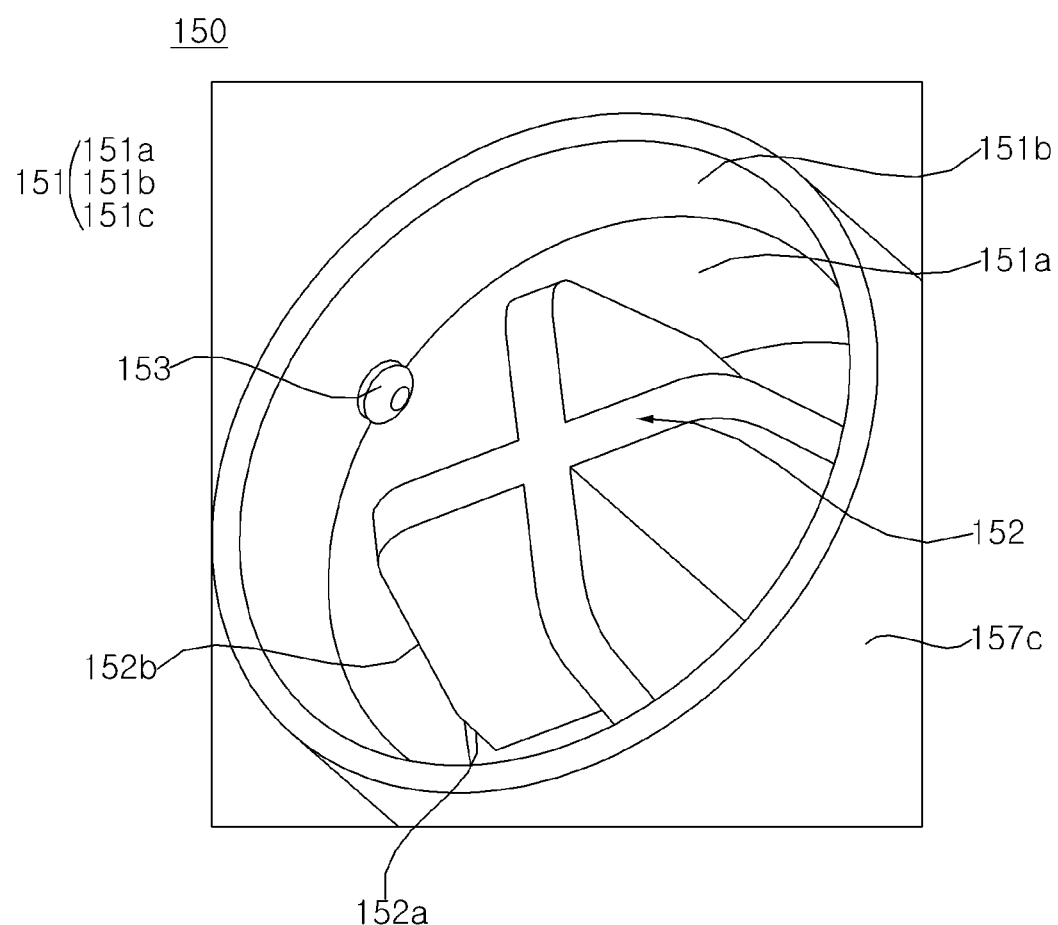
Figure 29:
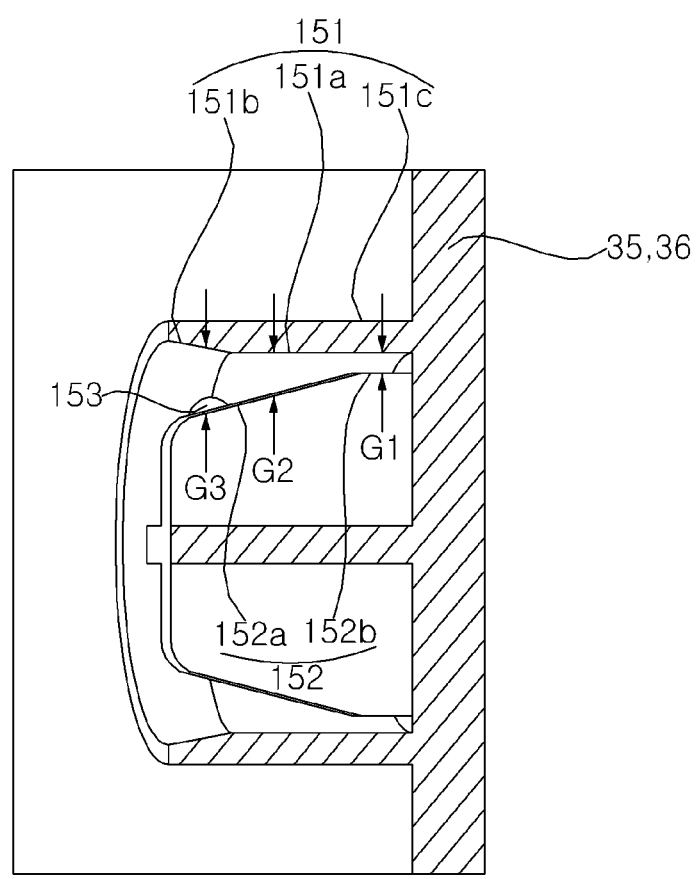

Referring to FIGS. 28 and 29, the coupling port 150 may have an outer cylinder 151 and an inner insert 152. The outer cylinder 151 may have a hollow cylindrical shape. The outer cylinder 151 may have an outer surface 151c, a first inner surface 151a, and a second inner surface 151b. The first inner surface 151a may be parallel to the outer surface 151c. The second inner surface 151b may extend from the first inner surface 151a to the distal end of the outer cylinder 151 in the state of being inclined. The diameter of the second inner surface 151b may gradually increase from the diameter of the first inner surface 151a to the diameter of the outer surface 151c. The second inner surface 151b may be referred to as a guide surface 151b, and the first inner surface 151a may be referred to as a forcible fitting surface 151a. A protrusion 153 may be formed inside the outer cylinder 151. For example, the protrusion 153 may be located at the border of the first inner surface 151a and the second inner surface 151b.

The inner insert 152 may be a rib extending from the side covers 35 and 36 (see FIG. 27) toward the distal end of the second inner surface 151*b* of the outer cylinder 151. The inner insert 152 may have a shape in which at least two ribs intersect. The inner insert 152 may have a first outer surface 152*a* and a second outer surface 152*b*. The first outer surface 152*a* may be spaced apart from the first inner surface 151*a* of the outer cylinder 151, and may be parallel to the first inner surface 151*a* of the outer cylinder 151. For example, the distance G1 between the first inner surface 151*a* of the outer cylinder 151 and the first outer surface 152*a* of the inner insert 152 may be substantially equal to or less than the thickness of the pipe 110. The second outer surface 152*b* of the inner insert 152 may extend from the first outer surface 152*a* to the distal end of the inner insert 152 in the state of being inclined. The second outer surface 152*b* of the inner insert 152 may be gradually distant from the first inner surface 151*a* and/or the second inner surface 151*b* of the outer cylinder 151. For example, the inner insert 152 may have a wedge shape. The second outer surface 152*b* of the inner insert 152 may face the first inner surface 151*a* and the second inner surface 151*b* of the outer cylinder 151.

The distance G1 between the first inner surface 151*a* of the outer cylinder 151 and the first outer surface 152*a* of the inner insert 152 may be less than the distance G2 between the first inner surface 151*a* of the outer cylinder 151 and the second outer surface 152*b* of the inner insert 152. The distance G2 between the first inner surface 151*a* of the outer cylinder 151 and the second outer surface 152*b* of the inner insert 152 may be less than the distance G3 between the second inner surface 151*b* of the outer cylinder 151 and the second outer surface 152*b* of the inner insert 152.

Figure 30:
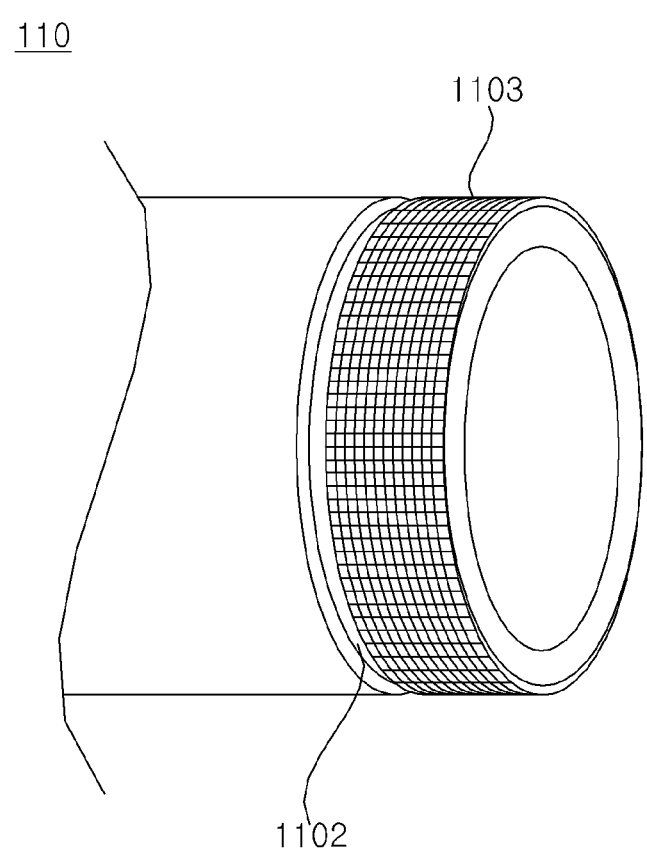

Referring to FIG. 30, the pipe 110 may have a forcible fitting surface 1103. The forcible fitting surface 1103 may be formed at the outer surface of the pipe 110 between the neck 1102 of the pipe 110 and the distal end of the pipe 110. The forcible fitting surface 1103 may be a coarse surface. For example, the forcible fitting surface 1103 may be a knurling portion.

Figure 31:
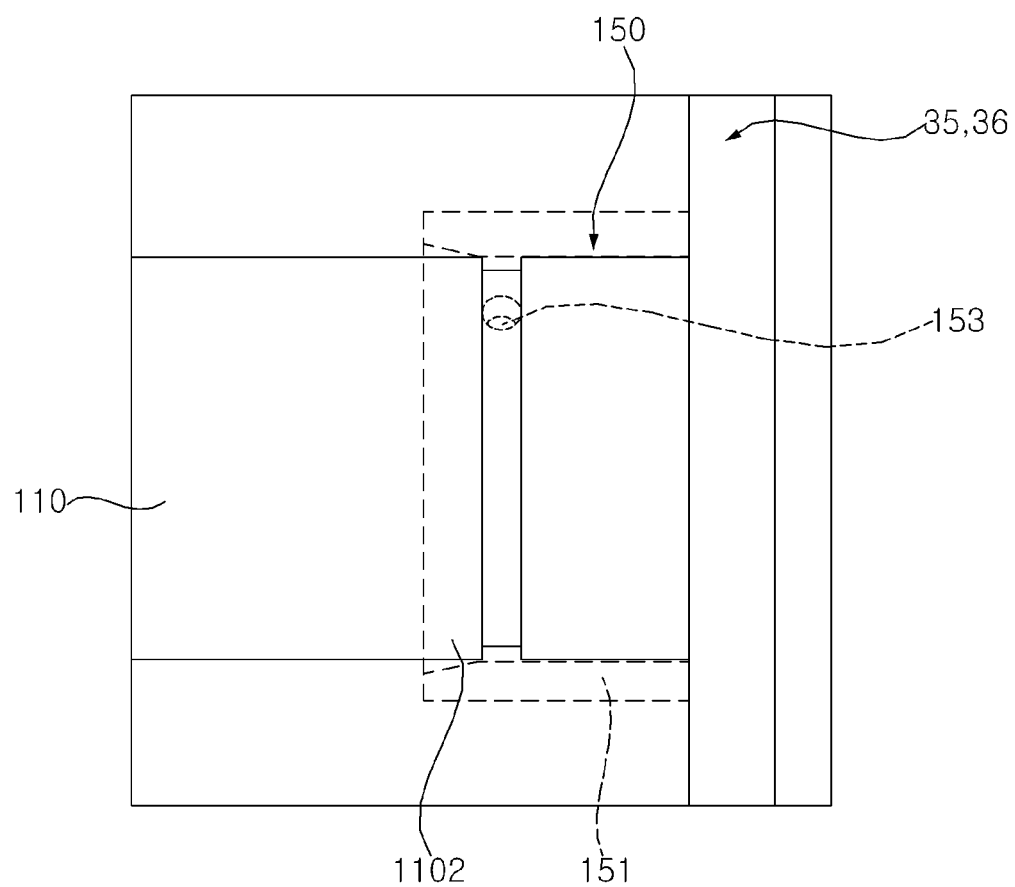
Figure 32:
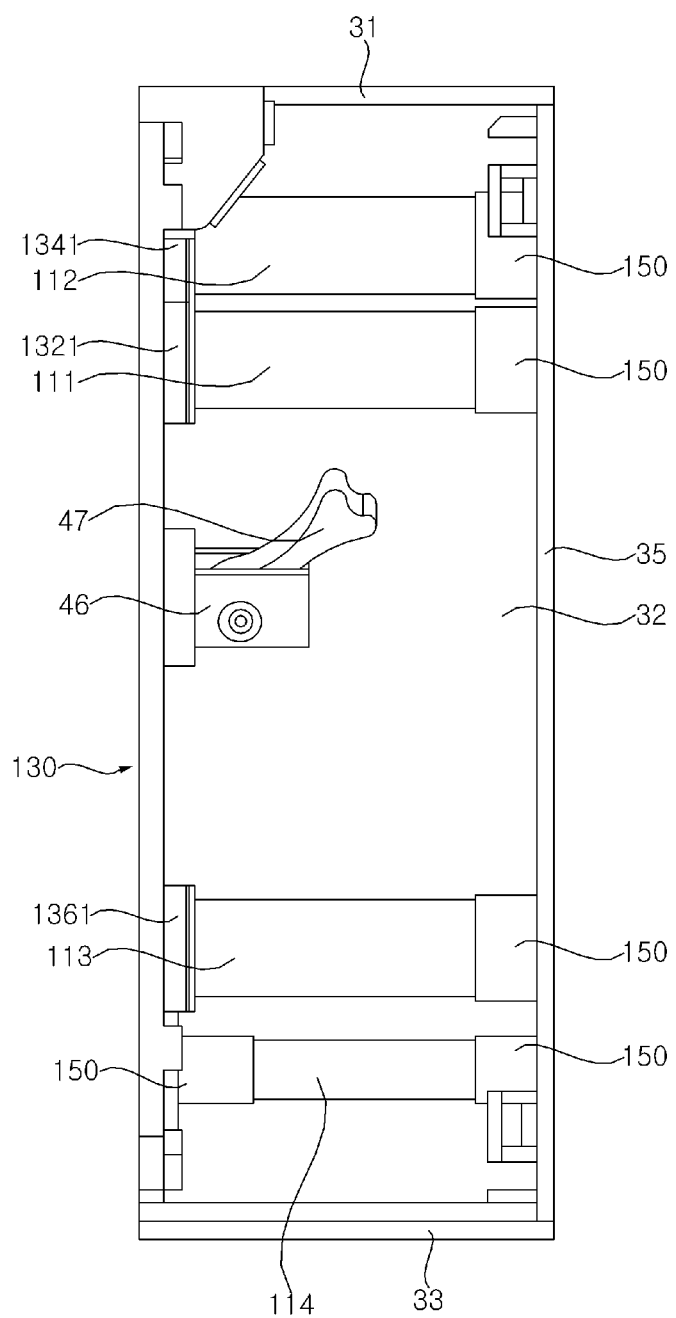
Figure 33:
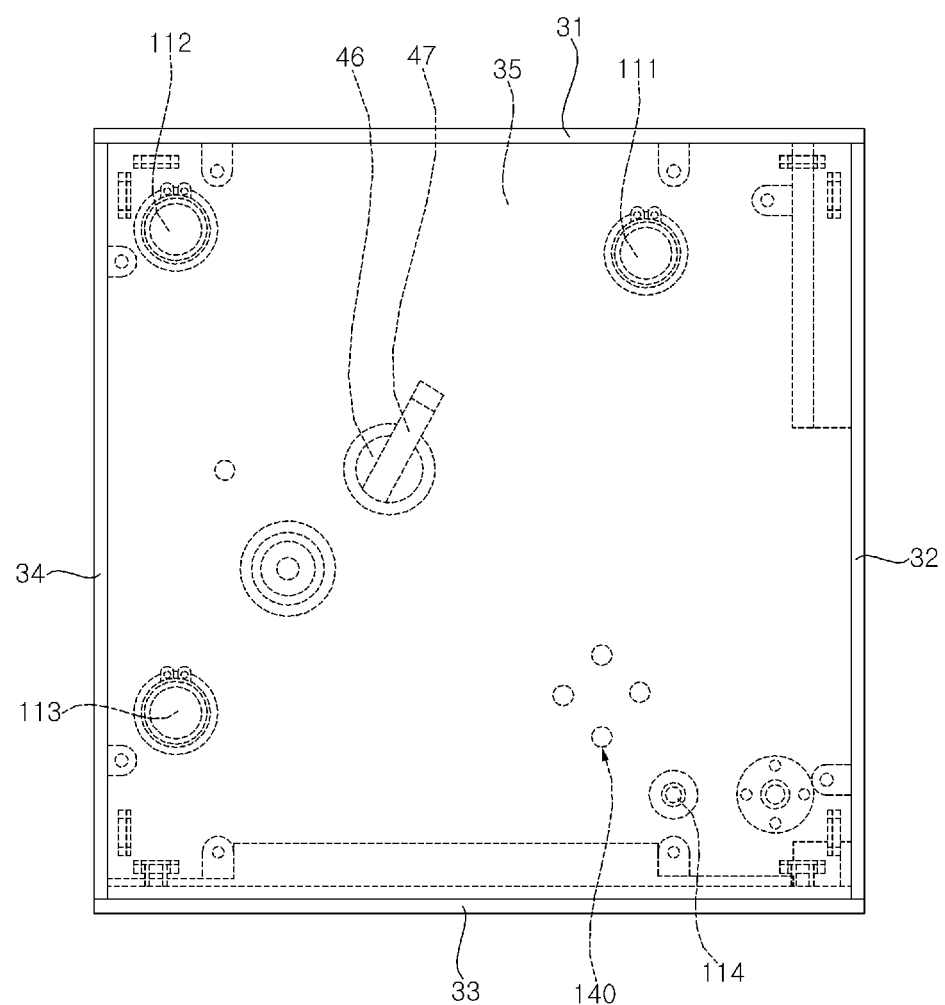

Referring to FIGS. 31 to 33, the pipe 110 may be inserted or forcibly fitted into the coupling port 150. The protrusion 153 may be inserted into the second neck 1102 of the pipe 110. The first pipe 111, the second pipe 112, and the third pipe 113 may be inserted or forcibly fitted into corresponding coupling ports 150. Consequently, it is possible to secure twisting rigidity of the display device.

Figure 23:
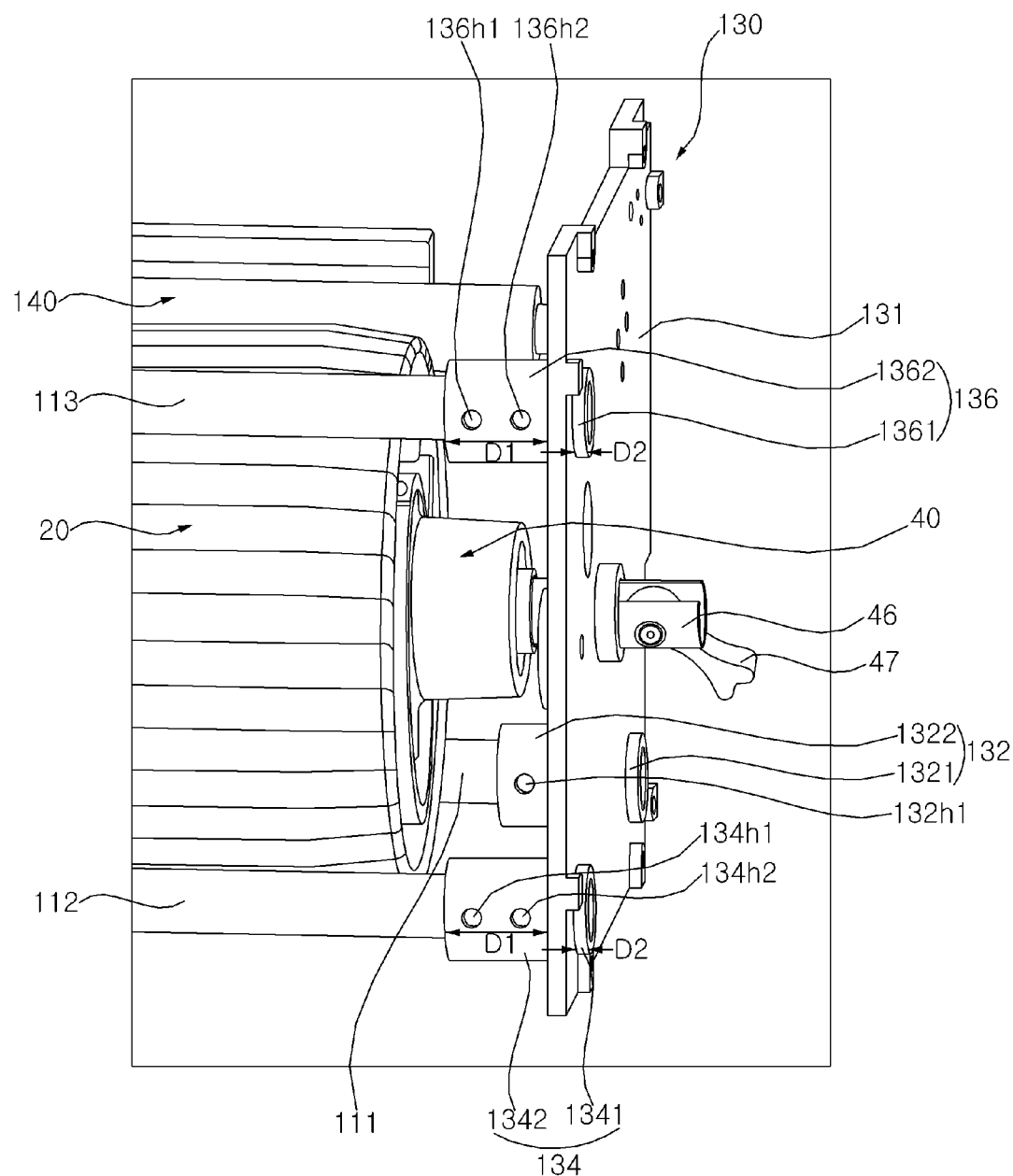
Figure 24:
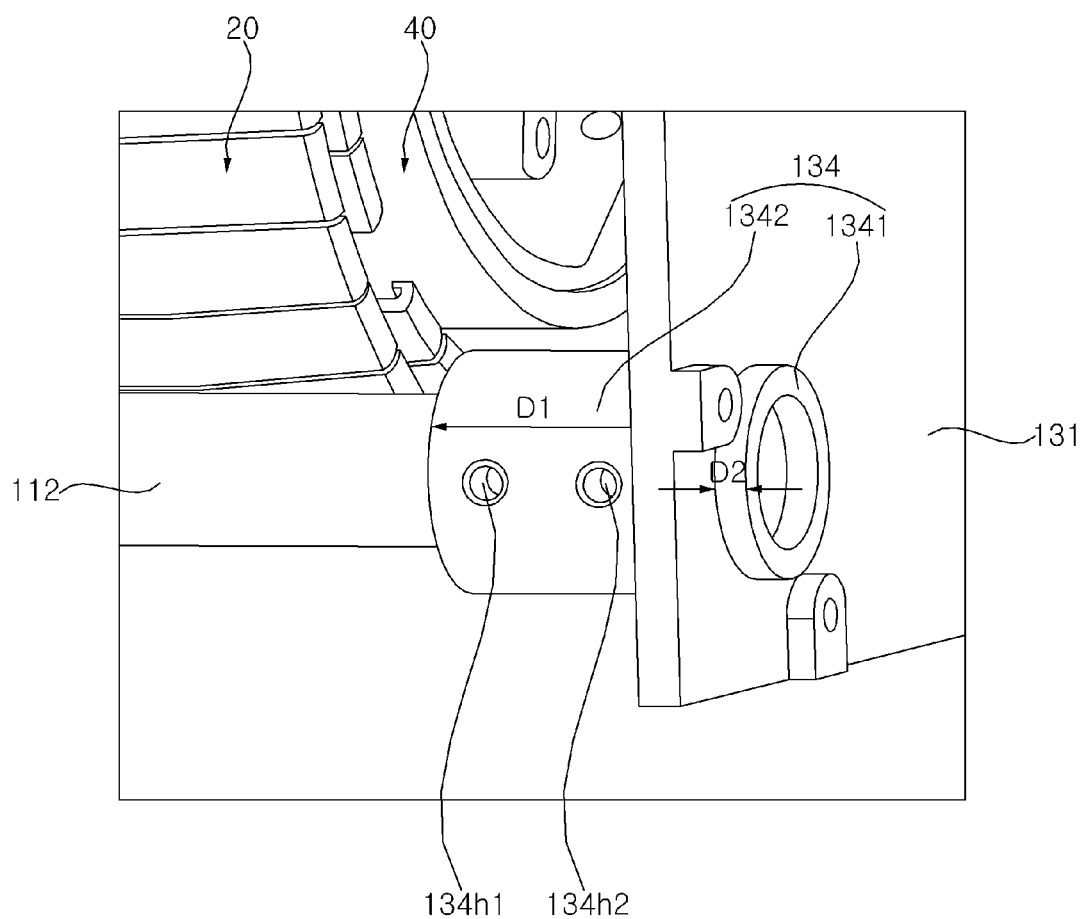

An auxiliary pipe 114 may be opposite the second pipe 112 with respect to the shaft 46 of the panel roller 40 (see FIG. 23). The auxiliary pipe 114 may be inserted or forcibly fitted into the coupling ports 150 formed in the second frame 130 and the side cover 35. Consequently, it is possible to further secure twisting rigidity of the display device and to secure coupling stability of the side cover.

Figure 34:
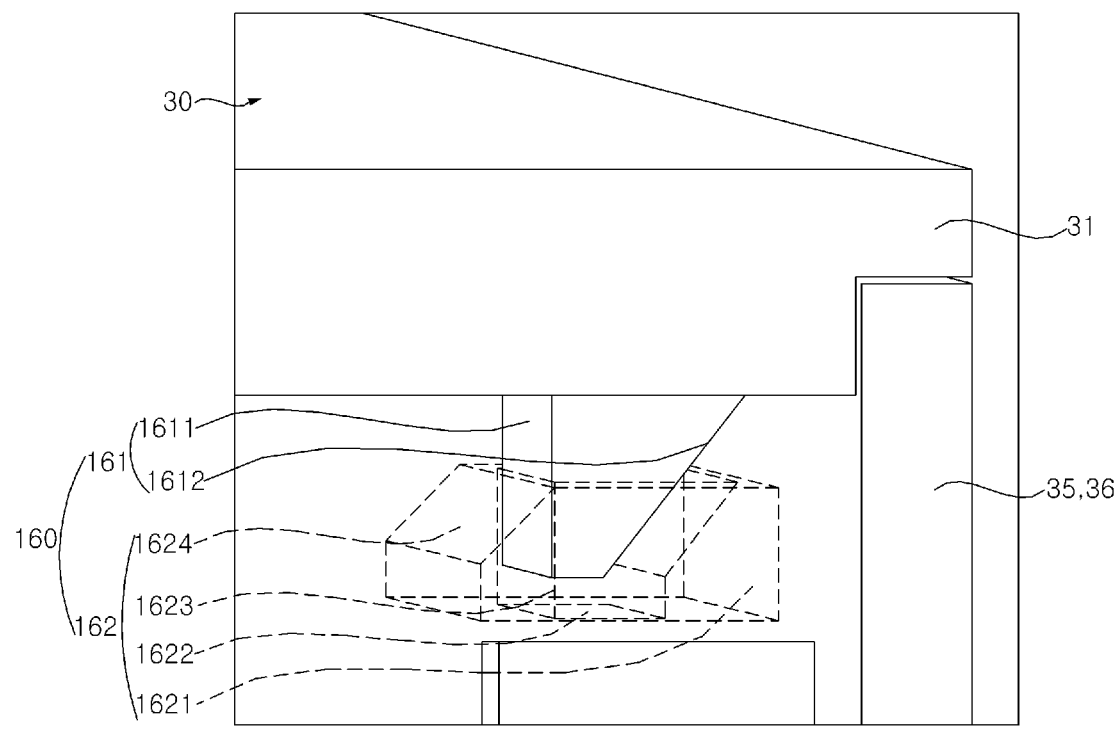

Referring to FIG. 34, a side coupler 160 may couple the housing 30 to the side covers 35 and 36. The side coupler 160 may include a catching portion 161 and a holder 162. The catching portion 161 may protrude from the inside of the upper plate 31 of the housing 30. The catching portion 161 may have a catching surface 1611 and an inclined surface 1612. The catching surface 1611 may extend downwards from the inner surface of the upper plate 31 of the housing 30. The inclined surface 1612 may connect the lower end of the catching surface 1611 and the inner surface of the upper plate 31 to each other. The inclined surface 1612 may face the side covers 35 and 36.

The holder 162 may be formed inside the side covers 35 and 36. The holder 162 may include a fixing portion 1621, a catching recess 1622, and a stopper 1623 and 1624. The fixing portion 1621 may be fixed inside the side covers 35 and 36. The stopper 1623 and 1624 may be located so as to be spaced apart from the fixing portion 1621. The catching recess 1622 may connect the fixing portion 1621 and the stopper 1623 and 1624 to each other. The catching recess 1622 may provide a space into which the catching portion 161 is inserted. The stopper 1623 and 1624 may have a vertical surface 1623 that faces or contacts the catching surface 1611 of the catching portion 161 and a guide surface 1624 on which the inclined surface 1612 of the catching portion 161 slides. The bottom surface of the catching recess 1622 may be spaced apart from the catching portion 161.

The side coupler 160 may be provided the lower plate 33, the front plate 34, and the rear plate 32 as well as the upper plate 31 of the housing 30. Consequently, the upper plate 31, the lower plat 33, the front plate 34, and/or the rear plate 32 may be securely coupled to the side covers 35 and 36.

Figure 35:
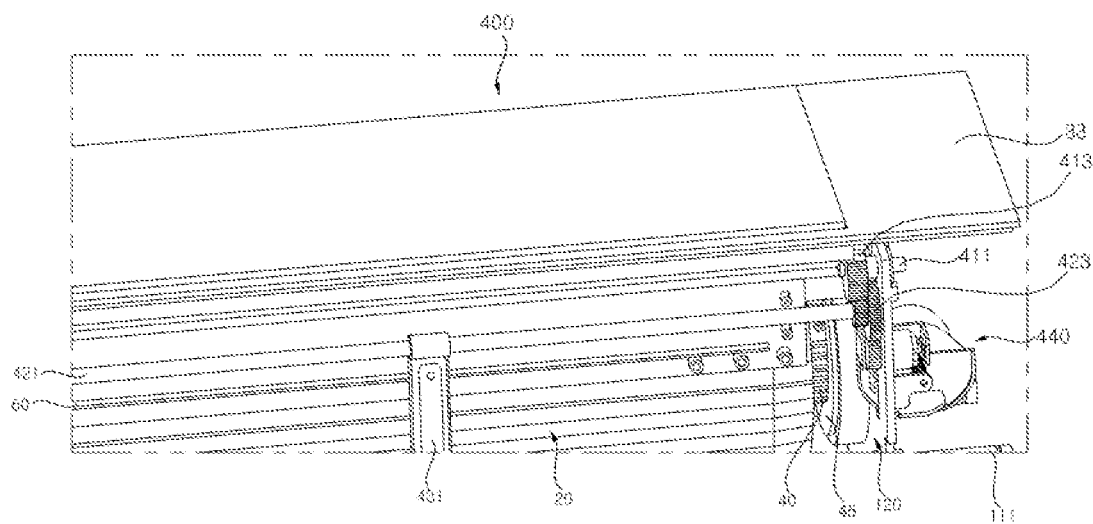
Figure 36:
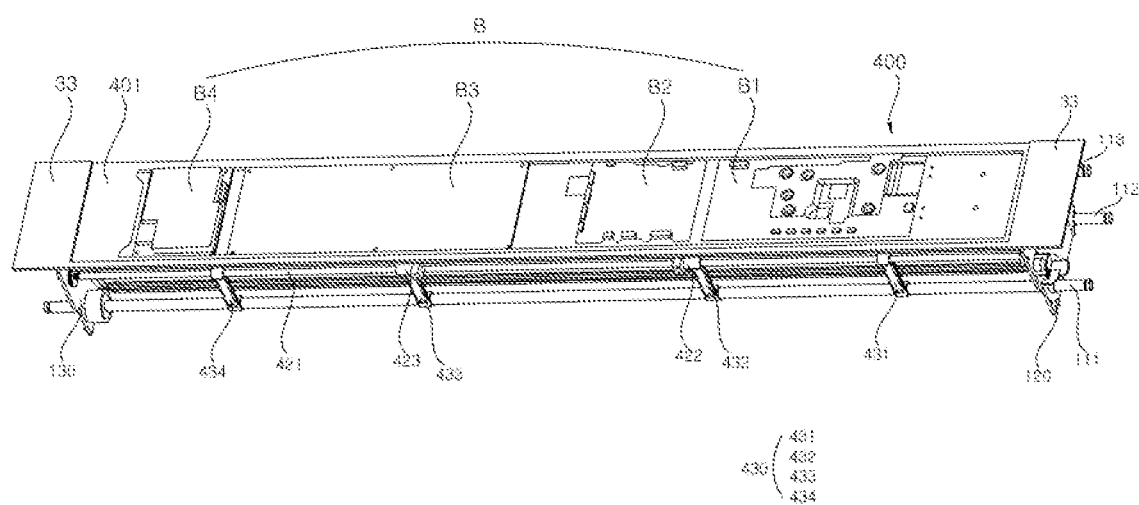

Referring to FIGS. 35 and 36, a door 400 may be coupled to the lower plate 33 of the housing 30. The door 400 may open and close the opening in the lower plate 33. The lower plate 33 of the housing 30 may have an elongate rectangular shape. The door 400 may be referred to as a door assembly 400.

The door 400 may have a smaller size than the lower plate 33 of the housing 300. The length of the door 400 may be less than the length of the lower plate 33 of the housing 30, and the width of the door 400 may be less than the width of the lower plate 33 of the housing 30.

Figure 37:
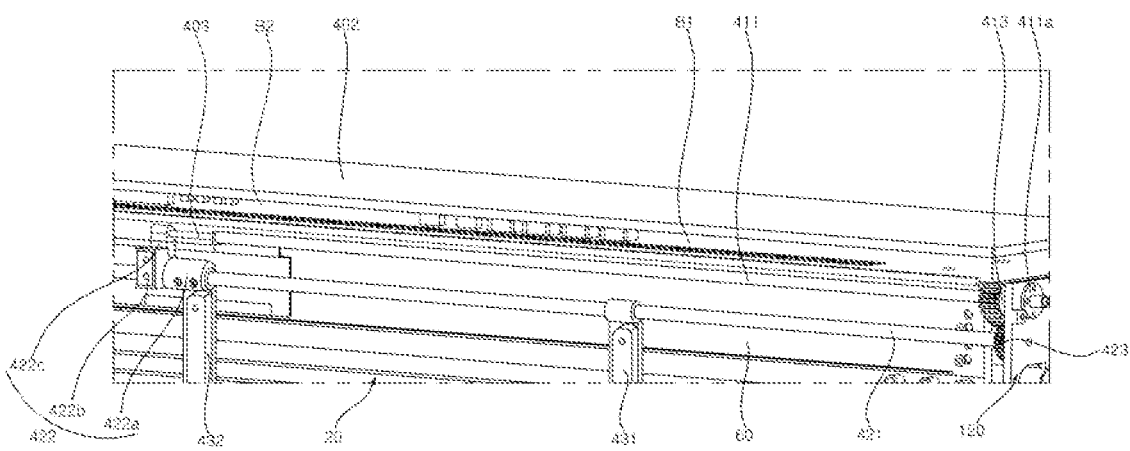

The door 400 may include a storage case 401 and a cover 402 (see FIG. 37). A control board B may be received in the storage case 401. For example, the control board B may be composed of a main board B1, a power supply unit B3, drive control boards B2 and B4 and the like. The boards of the control board B may be sequentially disposed adjacent to the storage case 401. The cover 402 may be coupled to the storage case 401. The cover 402 may cover the control board B received in the storage case 401.

A bracket 430 may be coupled or fixed to the pipe 111. The bracket 430 may include a plurality of brackets. A first bracket 431 is fixed to the first pipe 111 adjacent to the first frame 120. A fourth bracket 434 may be fixed to the first pipe 111 adjacent to the second frame 130. A second bracket 432 may be positioned between the first bracket 431 and the fourth bracket 434, and may be fixed to the first pipe 111. A third bracket 433 may be positioned between the second bracket 432 and the fourth bracket 434, and may be fixed to the first pipe 111.

Figure 38:
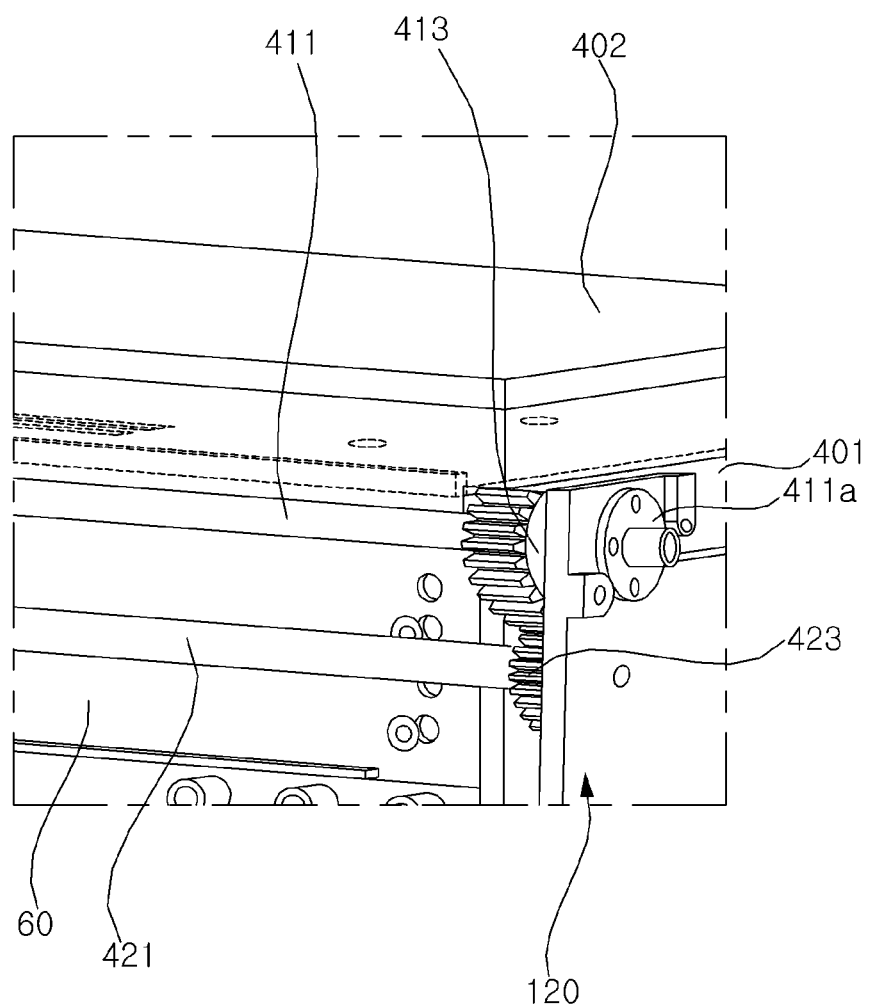
Figure 39:
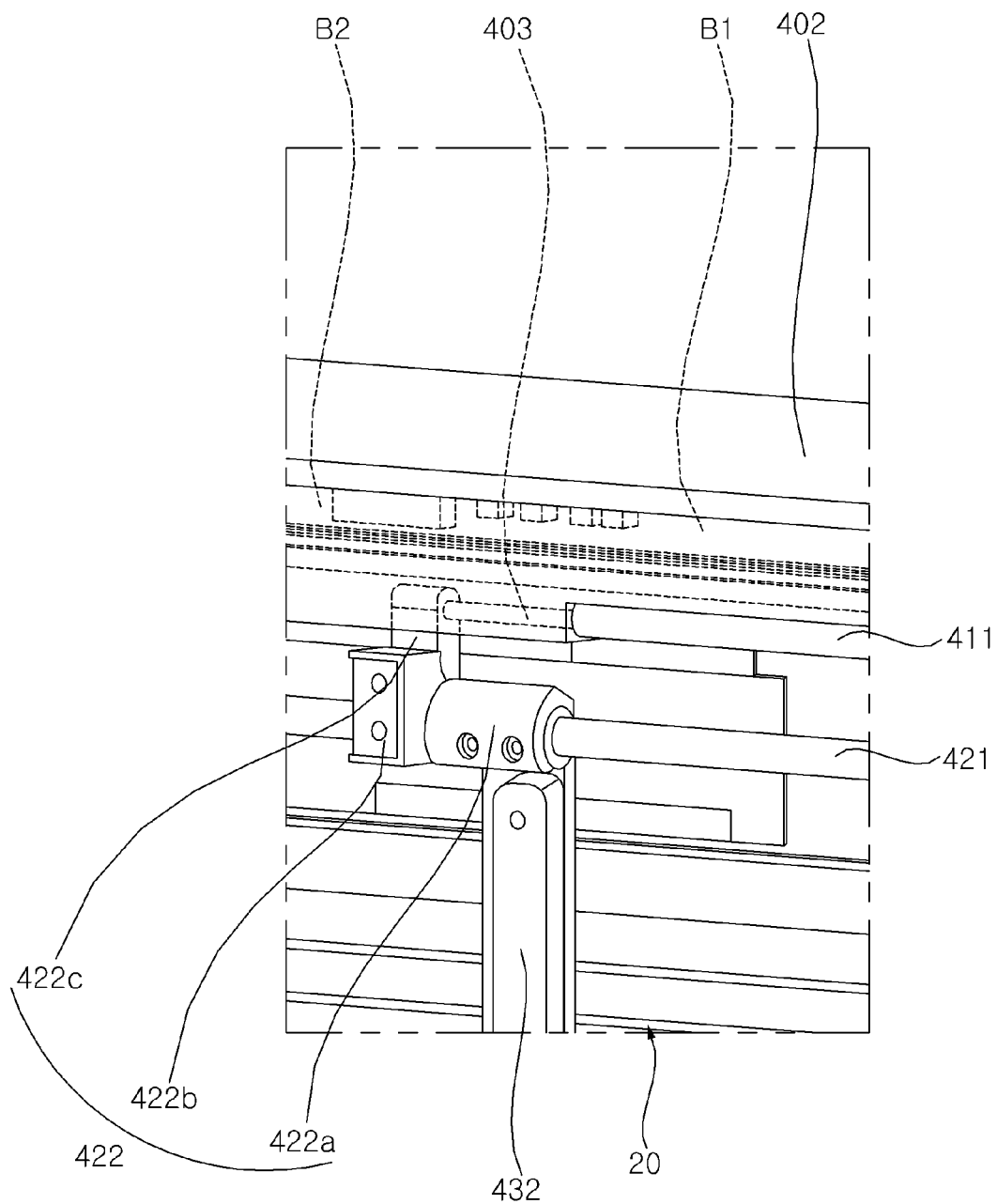

Referring to FIGS. 37 to 39, a first door shaft 411 may be coupled to the door 400. The first door shaft 411 may be positioned adjacent to the lower edge of the long side of the door 400. The first door shaft 411 may be coupled at one end thereof to the door 400 and at the other end thereof to the first frame 120. The other end of the first door shaft 411 may be fitted into the first frame 120, and may be rotatable relative to the first frame 120. A fixing plate 411*a* may be forcibly fitted onto the first door shaft 411. The holding plate 411*a* may be fixed to the first door shaft 411, and may be positioned so as to face or contact the outer surface of the first frame 120.

The door 400 may include a first shaft coupler 403. The first shaft coupler 403 may be formed at the long side of the storage case 401. The first door shaft 411 may be fitted into the first shaft coupler 403, and may be fixed thereto. The first door shaft 411 may be a hollow pipe. The first door shaft 411 may be fitted into a first door gear 413. The first door gear 413 may face or contact the inner surface of the first frame 120. The first door gear 413 may be fixed to the first door shaft 411 so as to be rotatable therewith.

A first shaft holder 422 may be coupled both to the second bracket 432 and to the first door shaft 411. The first shaft holder 422 may include a body 422b, a door shaft holder 422c, and a rotating shaft holder 422a. The other side of the first door shaft 411 may be fixed to the first shaft coupler 403, and may be fitted into the door shaft holder 422c and rotatable therein. The door shaft holder 422c may project from one side of the body 422b. The rotating shaft holder 422a of the first shaft holder 422 may be connected to the upper side of the second bracket 432.

The second bracket 432, which is longitudinally elongate, may be rolled at one side thereof. A rotating shaft 421 may be fitted into the rolled side of the second bracket 432 and may be rotatable therein. The second bracket 432 may stably support the rotating shaft 421. The rotating shaft holder 422a of the first shaft holder 422 may be coupled to the upper rolled side of the second bracket 432. The rotating shaft holder 422a may surround the upper rolled side of the second bracket 422a. The rotating shaft 421 may be fitted into the rolled side of the first bracket 432 and may be rotatable therein. The first bracket 431 may stably support the rotating shaft 421.

Figure 40:
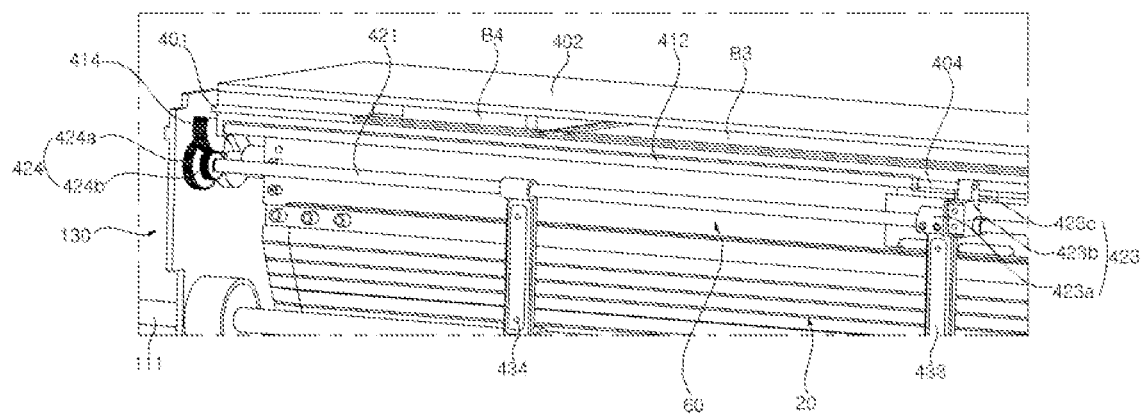
Figure 41:
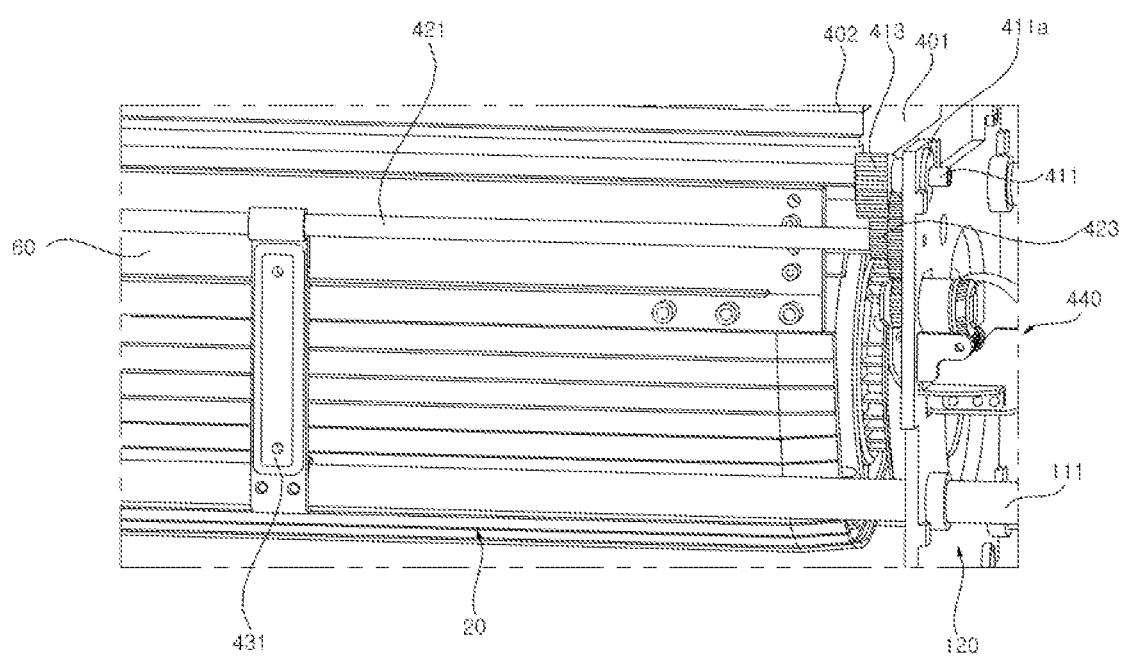
Figure 42:
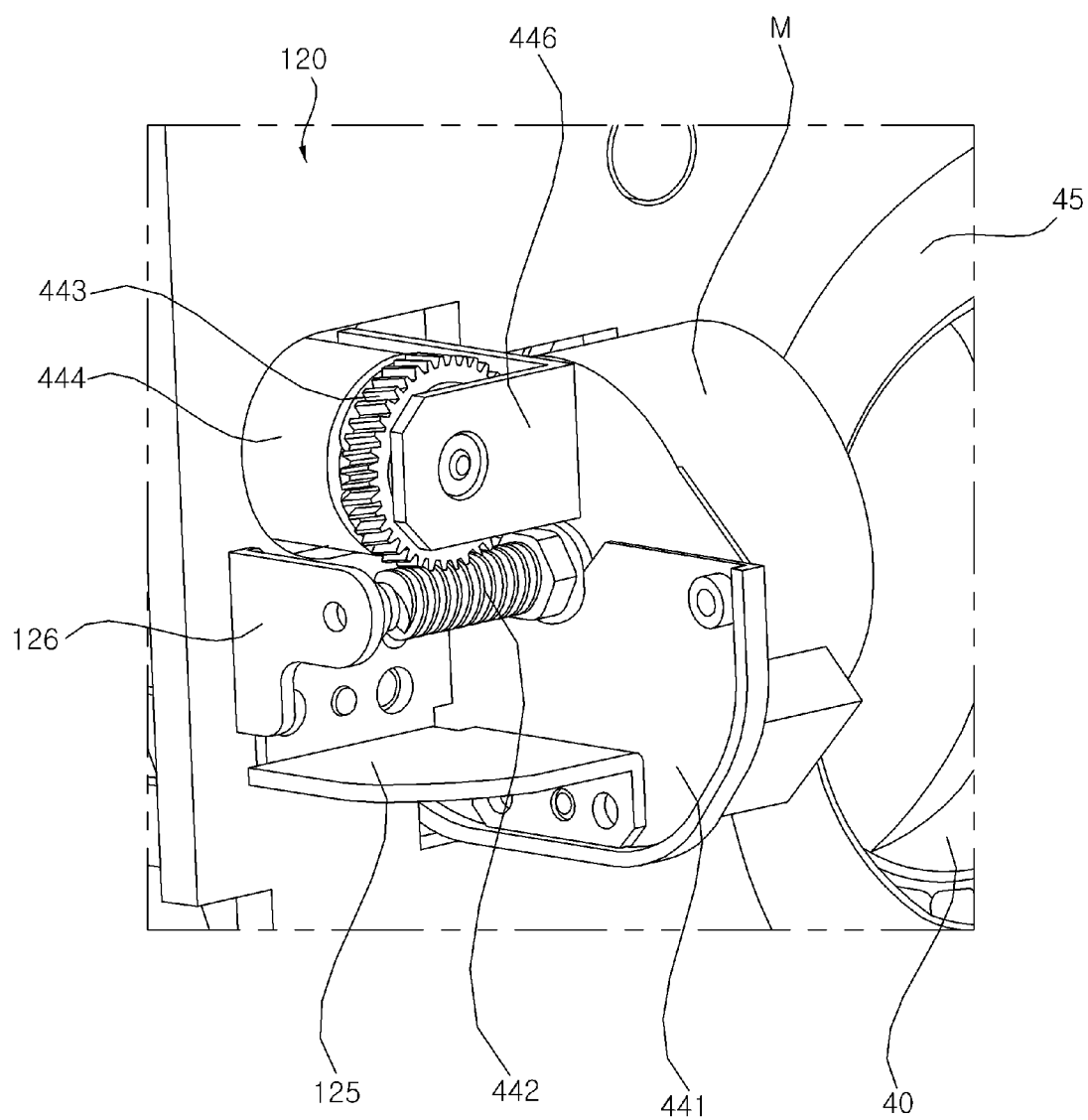

Referring to FIGS. 40 to 42, a second door shaft 412 may be coupled to the door 400. The second door shaft 412 may be positioned adjacent to the lower edge of the long side of the door 400. The second door shaft 412 may be coupled at one end thereof to the door 400 and at the other end thereof to the second frame 130. The other end of the second door shaft 412 may be fitted into the second frame 130, and may be rotatable relative to the second frame 130.

The door 400 may include a second shaft coupler 404. The shaft coupler 404 may be formed at the long side of the storage case 401 of the door 400. The second door shaft 412 may be fitted into the second shaft coupler 404 and may be fixed thereto. The second door shaft 412 may be a hollow pipe. The second door shaft 412 may be fitted into a second door gear 414. The second door gear 414 may face or contact the inner surface of the second frame 130. The second door gear 414 may be fixed to the second door shaft 412, and may be rotatable therewith.

The second shaft holder 423 may be coupled both to the third bracket 433 and to the second door shaft 412. The second shaft holder 423 may include a body 423b, a door shaft holder 423c, and a rotating shaft holder 423a. The other side of the second door shaft 412 may be fixed to the second shaft coupler 404, and may be fitted into the door shaft holder 423c and rotatable therein. The door shaft holder 423c may project from one side of the body 423b. The rotating shaft holder 423a of the second shaft holder 423 may be coupled to the upper side of the third bracket 433.

The third bracket 433, which is longitudinally elongate, may be rolled at one side thereof. The rotating shaft 421 may be fitted into the rolled side of the third bracket 433 and may be rotatable therein. The third bracket 433 may stably support the rotating shaft 421. The rotating shaft holder 423a of the second shaft holder 423 may be coupled to the upper rolled side of the third bracket 433. The rotating shaft holder 423a may surround the upper rolled side of the third bracket 433. The rotating shaft 421 may be fitted into the rolled side of the fourth bracket 434, and may be rotatable therein. The fourth bracket 434 may stably support the rotating shaft 421.

Figure 43:
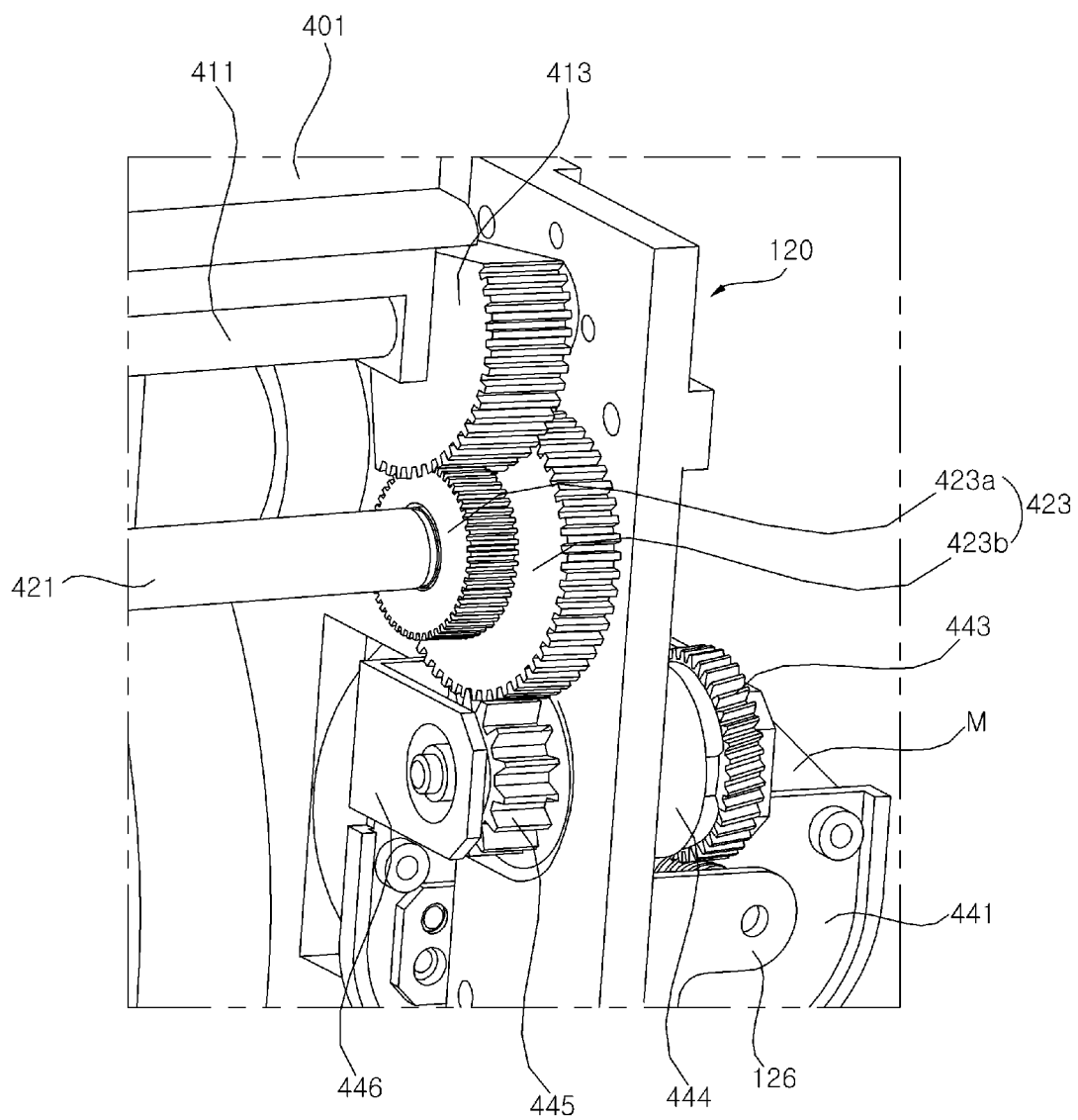
Figure 44:
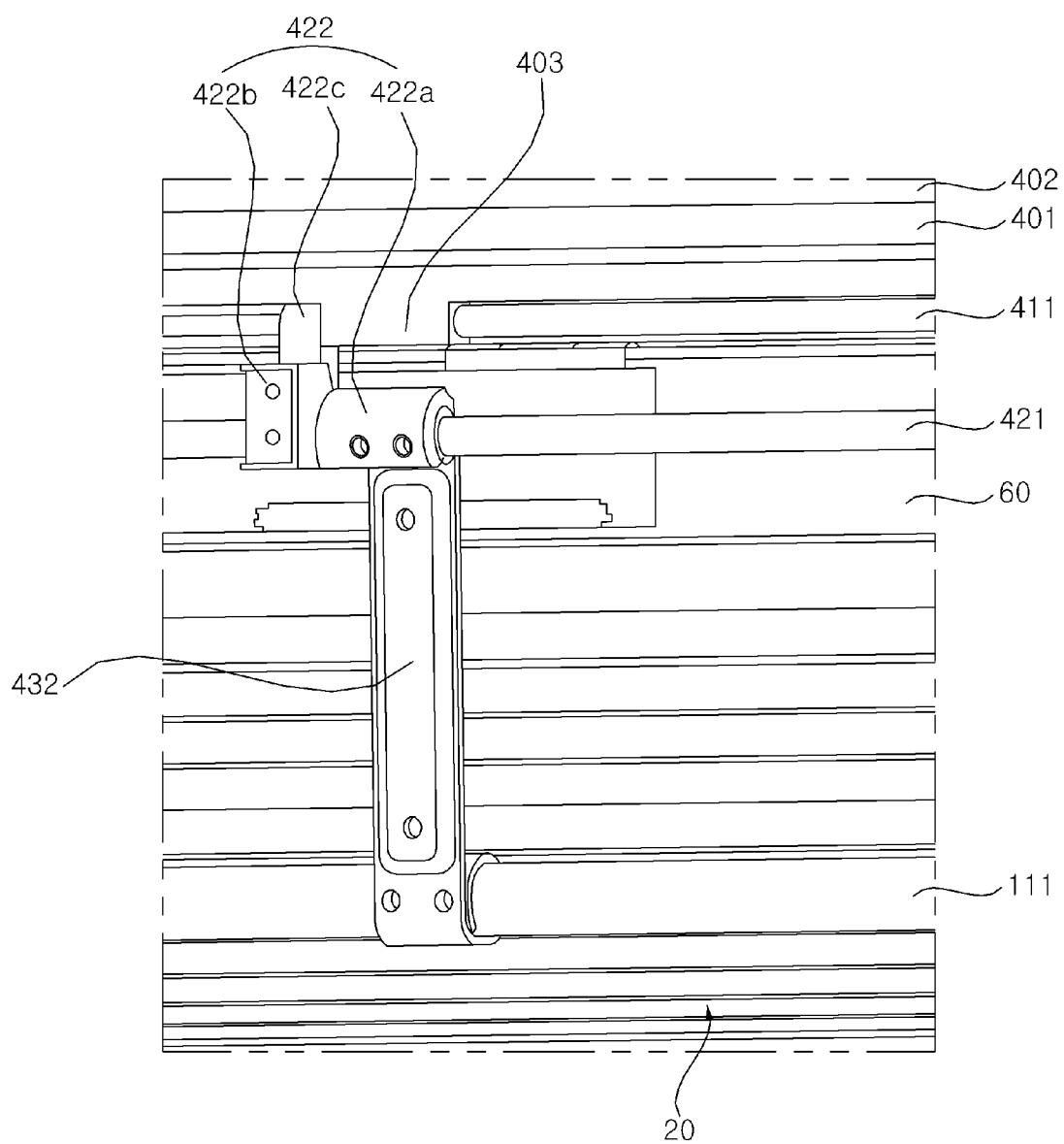
Figure 45:
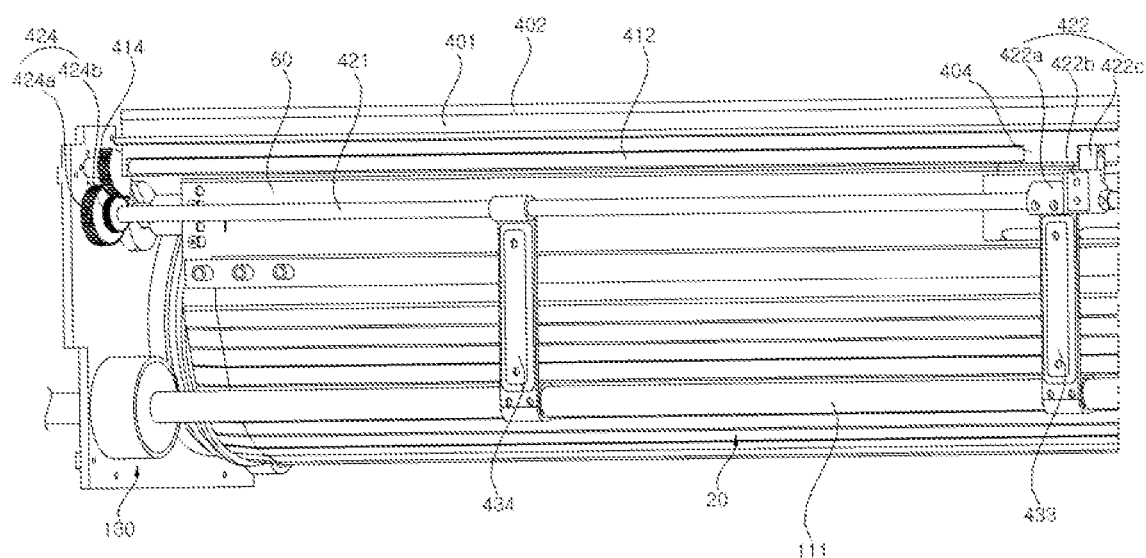

Referring to FIGS. 43 to 45, a door drive assembly 440 may be mounted on the first frame 120. The door drive assembly 440 may include a motor M, a worm 442, a first gear 443, a torque limiter 444, a second gear 445, and a third gear 423.

The motor bracket 125 may be fixed to the outer surface of the first frame 120. A motor-fixing plate 441 may be fixed to the motor bracket 125. The motor M may be fixed to the motor-fixing plate 441. The worm 442 may be fixed to the rotating shaft of the motor M. The motor M may rotate the worm 442.

A worm bracket 126 may be fixed to the outer surface of the first frame 120 adjacent to the motor bracket 125. The worm 442 may be rotatably mounted on the worm bracket 126. A gear bracket 446 may extend through the inner surface and the outer surface of the first frame 120, and may be fixed to the first frame 120. For example, the gear bracket 446 may be configured to have a "U" shape overall. The first gear 443, the torque limiter 444 and the second gear 445 may be mounted on the gear bracket 446.

The first gear 443 may be engaged with the worm 442. When the worm 442 is rotated, the first gear 443, which is engaged with the worm 442, is rotated. The second gear 445 may be rotated together with rotation of the first gear 443. The torque limiter 444 may be provided between the first gear 443 and the second gear 445. The torque limiter 444 may limit the torque that is transmitted to the second gear 445 to a predetermined level.

The rotating shaft 421 may be fitted into the third gear 423. The third gear 423 may be fixed to the rotating shaft 421. The third gear 423 may include an outer gear 423b and an inner gear 423a. The outer gear 423b may have a larger diameter than the inner gear 423a. The outer gear 423b may be engaged with the second gear 445, and the inner gear 423a may be engaged with the first door gear 413. The driving force output from the motor M may be transmitted to the first door gear 413.

Figure 46:
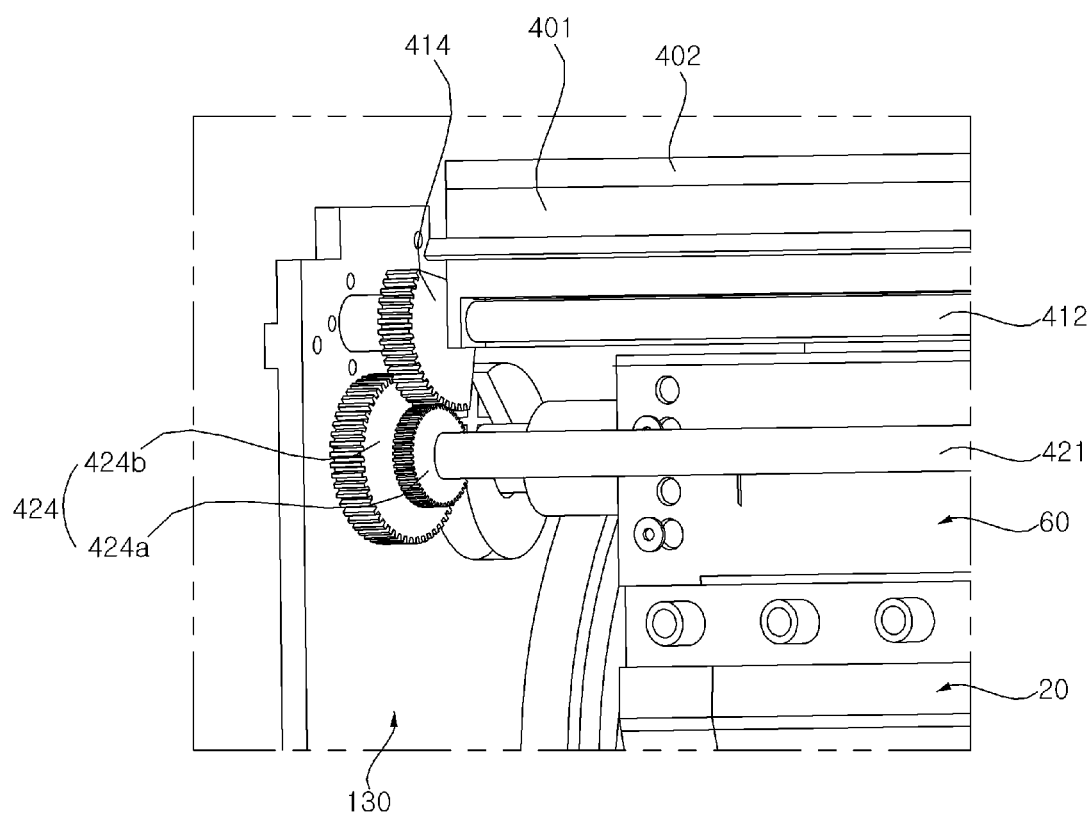
Figure 47:
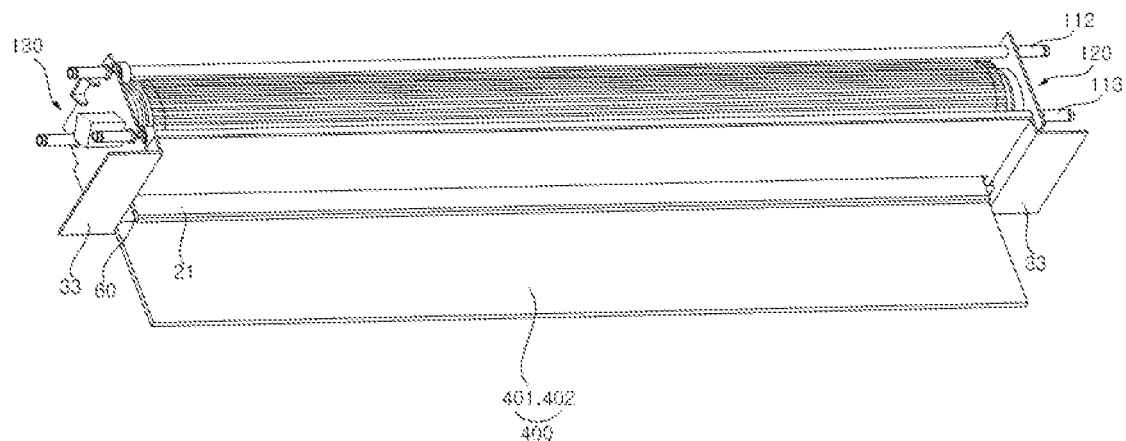

Referring to FIGS. 43, 46 and 47, a fourth gear 424 may be engaged with the second door gear 414. The rotating shaft 421 may be fitted into the fourth gear 424. The fourth gear 424 may include an outer gear 424b and an inner gear 424a. The outer gear 424b may have a larger diameter than the inner gear 424a. The inner gear 424a may be engaged with the second door gear 414. The outer gear 424b may be engaged with the second door gear 414.

The rotating shaft 421 is rotated by the driving force output from the motor M, thereby rotating the door gears 413 and 414. When the door gears 413 and 414 are rotated, the door shafts 411 and 412 are rotated, thereby opening or closing the door 400. When the door 400 is opened, the display panel 21 and/or the module cover 23 may be lowered.

Figure 48:
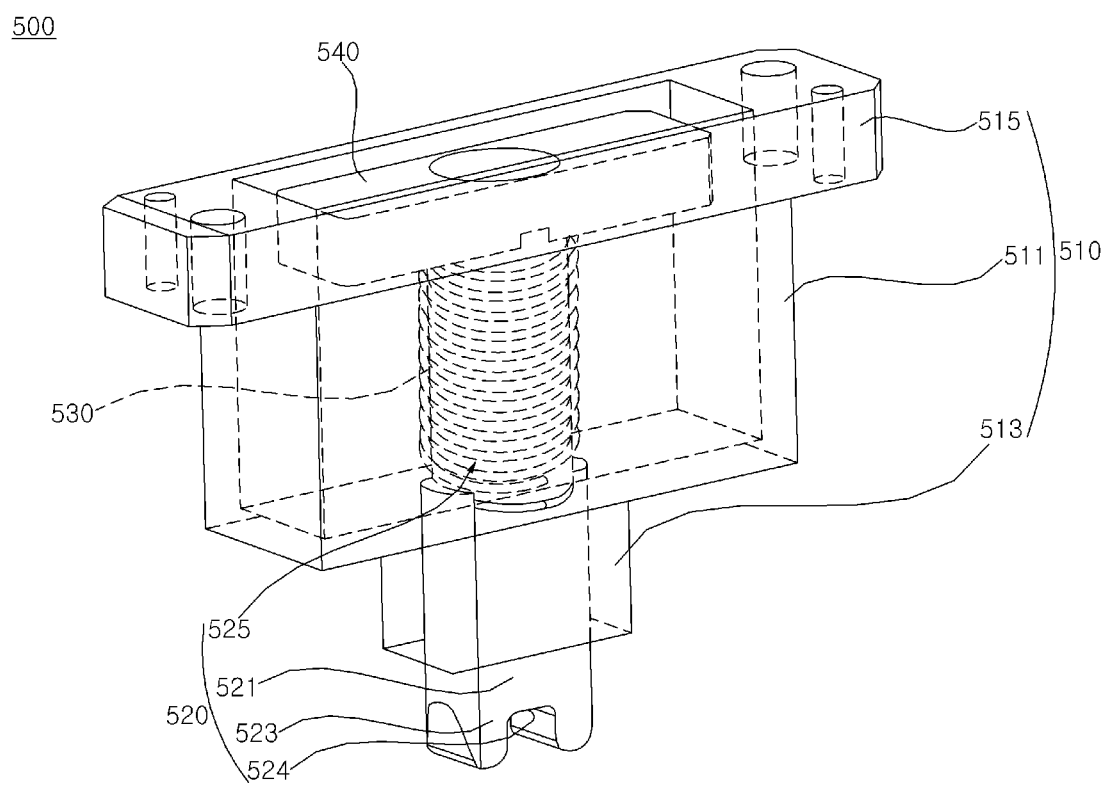
Figure 49:
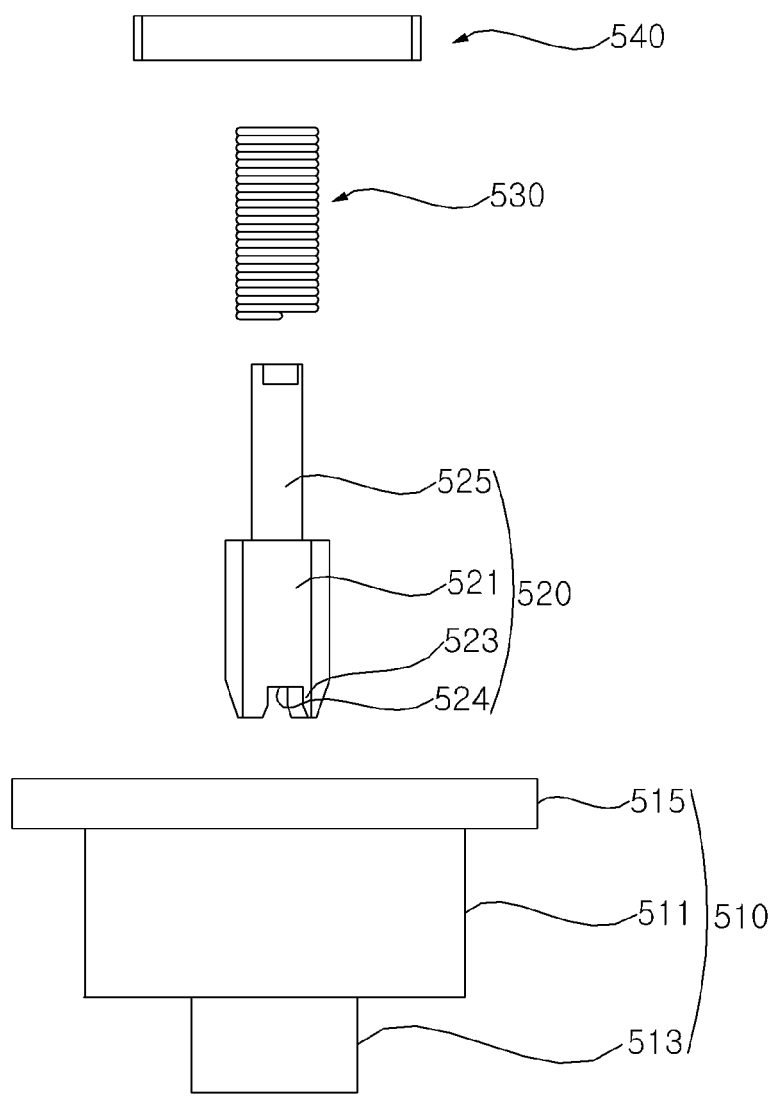

Referring to FIGS. 48 and 49, a side brake 500 may include a casing 510, a stopper 520, an elastic member 530 and a button 540. The casing 510 may be hollow. The casing 510 may include a body 511, an extension 513 and a coupler 515. The body 511 may be a hexahedral box having a predetermined thickness. The extension 513 may project and extend outwards from the bottom of the body 511. The coupler 515 may laterally extend and project in two directions from the upper end of the body 511.

The stopper 520 may include a rod 525 and a fork 521. The rod 525 may be a pole or bar that extends vertically. The fork 521 may have a cutout groove 524 formed in the lower surface thereof. Fingers 523 may project from two lateral sides of the groove 524. For example, the number of fingers 523 may be two.

The elastic member 530 may be configured to have a cylinder shape. For example, the elastic member 530 may be a coil-shaped compression spring. The rod 525 of the stopper 520 may be inserted into the elastic member 530. The lower end of the elastic member 530 may be supported by the casing 510, and the upper end of the elastic member 530 may be supported by the button 540.

The rod 525 of the stopper 520 may be fitted into the button 540, and may be fixed thereto. The stopper 520 may be moved vertically in the casing 510 together with the button 540. When the button 540 is pushed, the stopper 520 may be moved vertically in the casing 510, and the elastic member 530 may be compressed between the casing 510 and the button 540. When the external force applied to the button 540 is released, the compressed elastic member 530 may provide the button 540 with lifting force, thereby moving the button 540 and the stopper 520 upwards.

Figure 50:
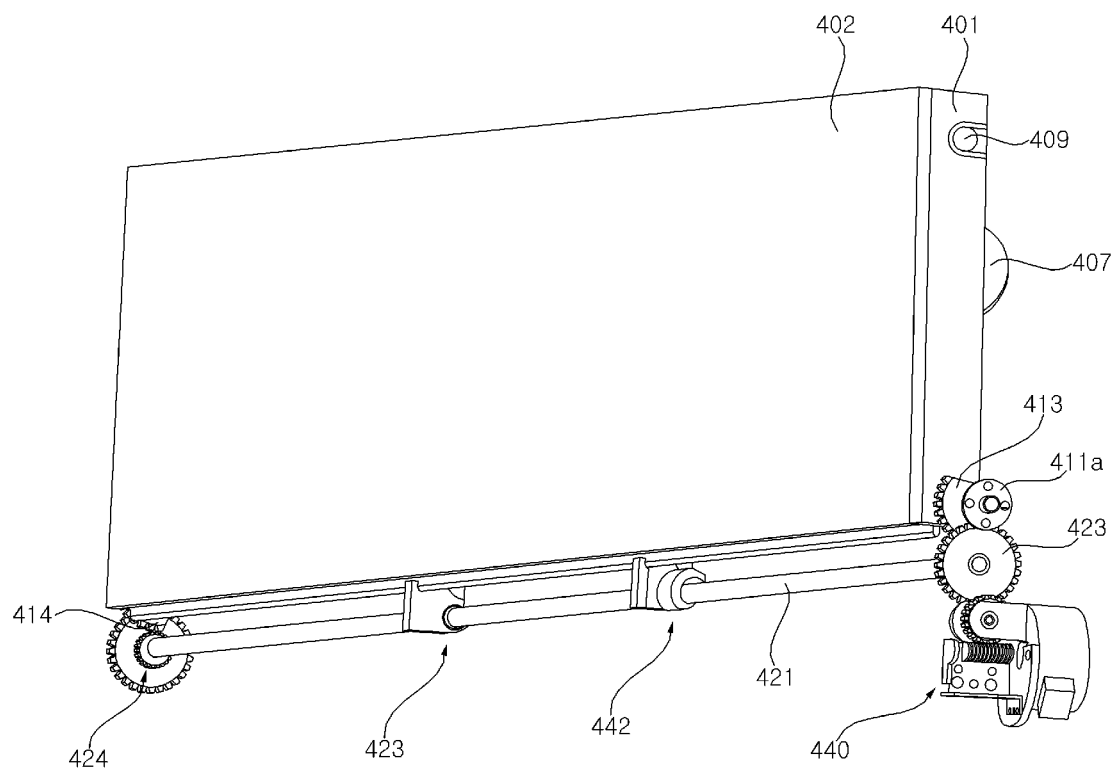
Figure 51:
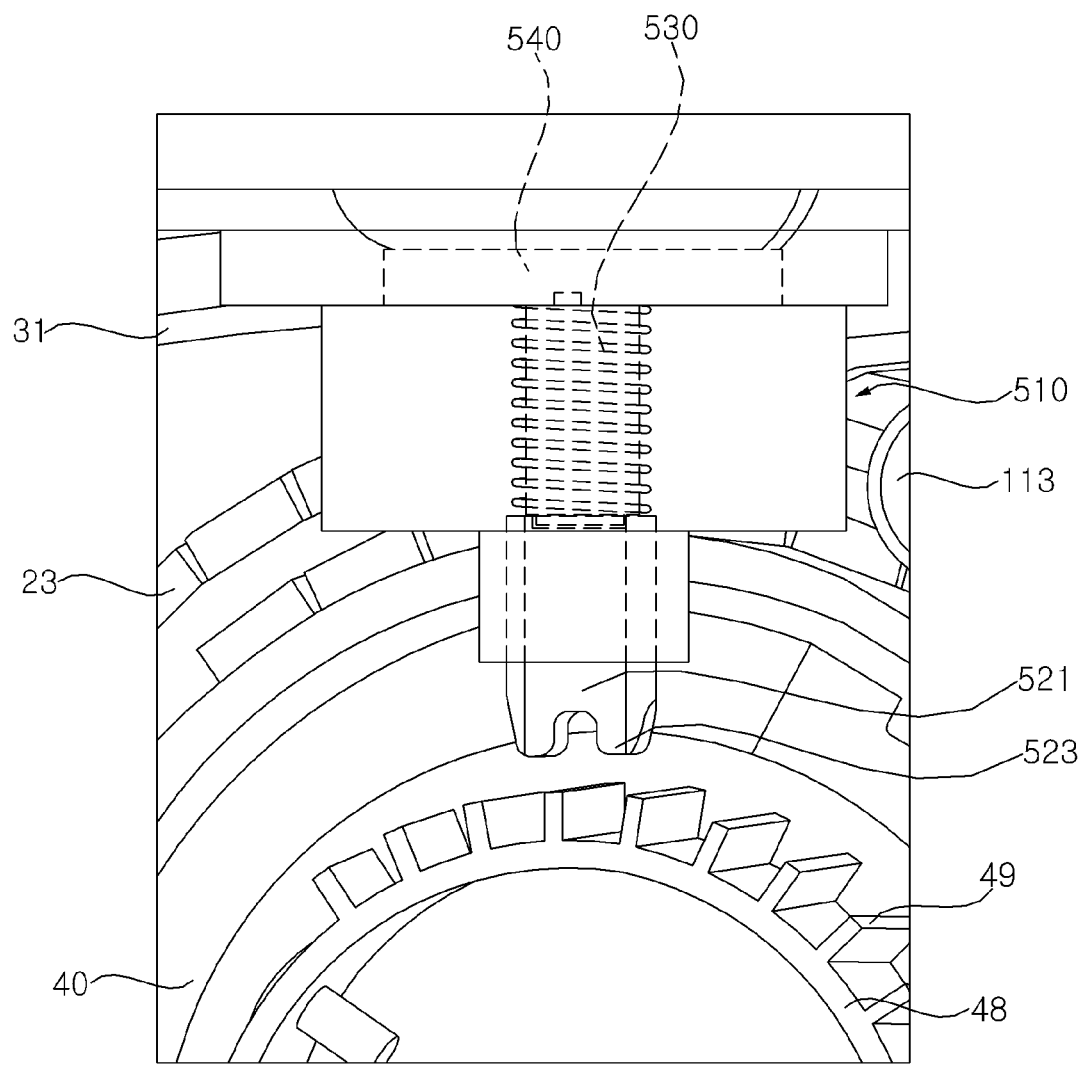

Referring to FIGS. 50 and 51, a push circle 407 may be positioned near the lower edge of the short side of the storage case 401 of the door 400. The push circle 407 may project from the lower surface of the storage case 401. For example, the push circle 407 may be a semicircular plate. The push circle 407 may be referred to as a pusher 407.

A holding button 409 may be provided on the lateral surface of the storage case 401. The holding button 409 may be pushed into the lateral surface of the storage case 401. When the external force applied to the holding button 409 is released, the holding button 409 may be restored to the original position thereof and may project from the outer surface of the storage case 401.

The panel roller 40 may include a rim 48. The rim 48 may project from one end of the panel roller 40. The rim 48 may be configured to have a ring shape overall. The rim 48 may be provided on the outer circumferential surface thereof with a plurality of ribs 49. The plurality of ribs 49 may be sequentially and circumferentially disposed along the outer circumferential surface of the rim 48. The plurality of ribs 49 may be spaced apart from each other at regular intervals.

The casing 510 of the side brake 500 may be mounted on the upper plate 31 of the housing 30 of the display device. The coupler 515 of the casing 510 may be fixed to the upper plate 31. The fork 521 of the stopper 520 may be positioned adjacent to the outer circumferential surface of the rim 48.

The door 400, 401 and 402 may be rotated about the door shafts 411 and 412 (see FIGS. 35 and 40) by the power supplied from the door drive assembly 440. The door 400, 401 and 402 may be opened by the power supplied from the door drive assembly 440. When the door 400, 401 and 402 is opened, the push circle 407 may be moved away from the button 540 of the side brake 500.

Figure 52:
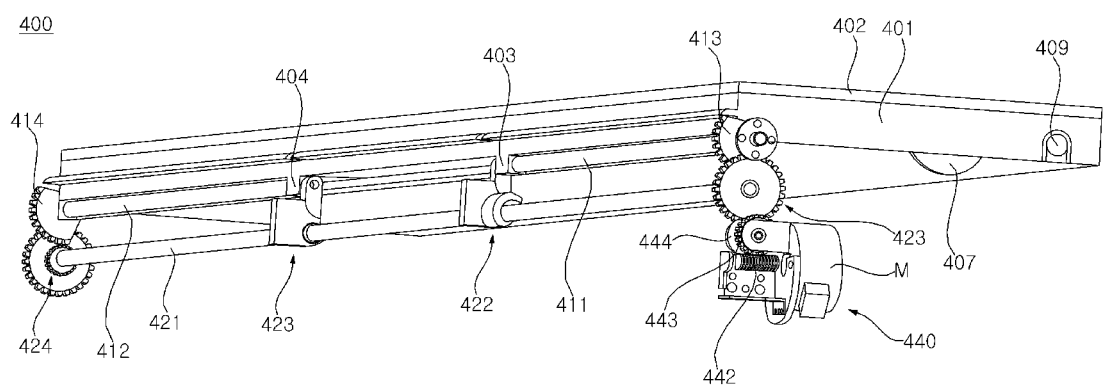
Figure 53:
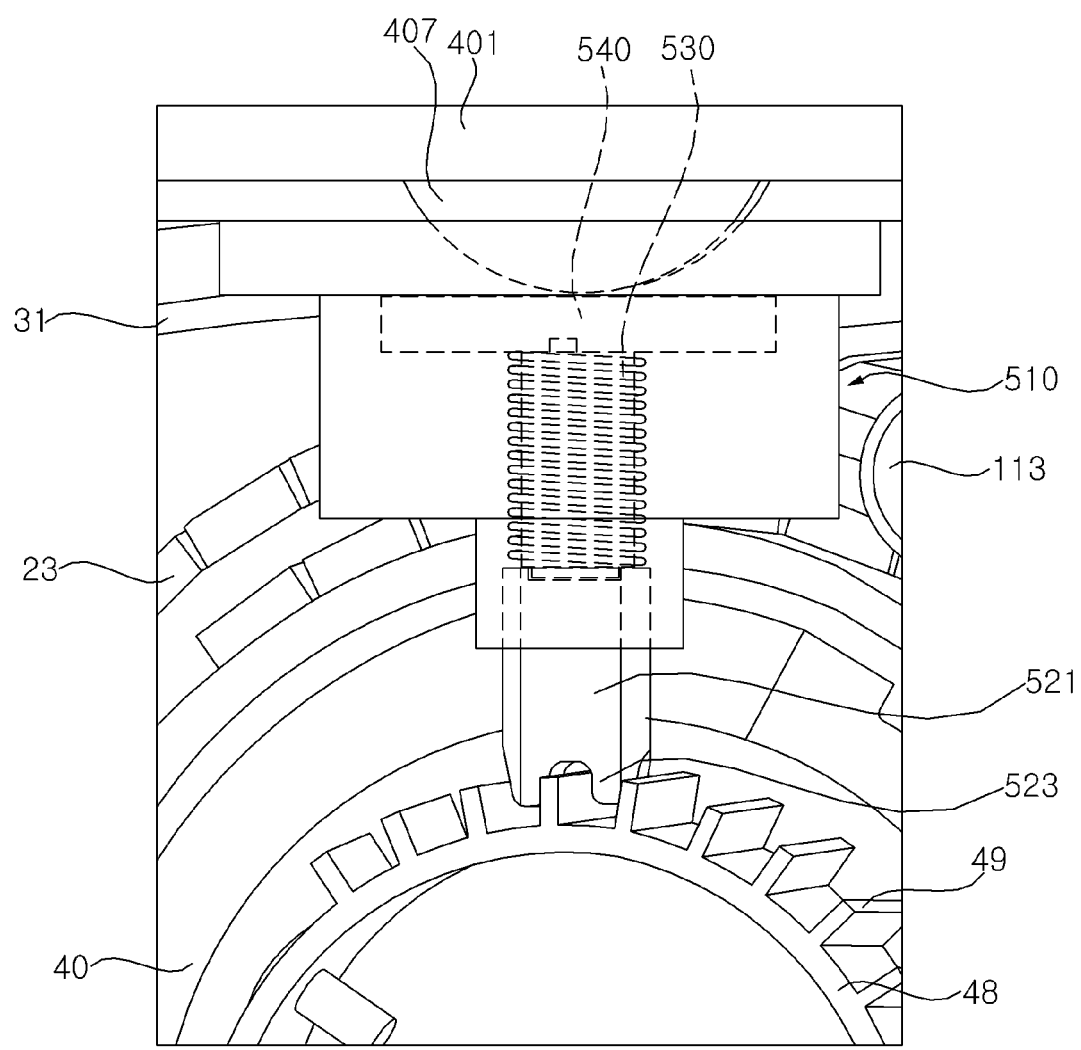

Referring to FIGS. 52 and 53, the door 400, 401 and 402 may be rotated about the door shafts 411 and 412 by the power supplied from the door drive assembly 440. The door 400, 401 and 402 may be closed by the power supplied from the door drive assembly 440. When the door 400, 401 and 402 is closed, the push circle 407 may push the button 540 of the side brake 500.

When the button 540 is pushed by the push circle 407, the stopper 520 fixed to the button 540 may be lowered from the casing 510. When the stopper 520 is lowered, the elastic member 540 may provide the button 540 with upward elastic force. The fork 521 of the stopper 520, which is lowered toward the panel roller 40, may be inserted between the plurality of ribs 49 formed on the rim 48 of the panel roller 40. For example, the groove 524 may be positioned at the upper end of one of the ribs 49, and the fingers 523 may be positioned between the ribs 49.

Accordingly, when the door 400, 401 and 402 is opened, the panel roller 40 may be rotated in the circumferential direction of the panel roller 40 through the small gap. When the door 400, 401 and 402 is closed, the panel roller 40 may be held without being rotated in the circumferential direction of the panel roller 40 by the action of the side brake 500.

In accordance with an aspect of the present disclosure, provided is a display device including a flexible display panel, a roller, which extends longitudinally and around which the display panel is wound and unwound, a first frame, to which a first end of the roller is rotatably coupled, a second frame, to which a second end of the roller is rotatably coupled and which opposites to the first frame with respect to the roller, a door, which is positioned adjacent to an end of the display panel unwound from the roller and which is pivotably connected to the first frame and the second frame, and a side brake, which is positioned between the door and the roller so as to be adjacent to the first frame and which restricts rotation of the roller when the door is closed.

In accordance with another aspect of the present disclosure, the side brake may include a casing, which is positioned between the door and the roller and which is positionally fixed with respect to the first frame, and a stopper, which is disposed in the casing and movable toward the roller from the door, the stopper being configured to project toward the roller from the casing to restrict rotation of the roller when the door is closed.

In accordance with an aspect of the present disclosure, provided is a display device including a flexible display panel, a roller extending in a longitudinal direction, wherein the flexible display panel is wound around or unwound from the roller, a first end of the roller rotatably coupled to a first frame, a second frame rotatably coupled to a second end of the roller and disposed opposite to the first frame with respect to the roller, a door disposed adjacent to an end of the flexible display panel unwound from the roller and coupled to the first frame and the second frame, and a side brake positioned between the door and the roller and the side brake is adjacent to the first frame when the door is closed, wherein the side brake restricts rotation of the roller.

In accordance with another aspect of the present disclosure, the side brake may include a casing positioned between the door and the roller and coupled to the first frame, and a stopper disposed in the casing and movable toward the roller from the door for moving vertically in the casing to restrict rotation of the roller when the door is closed.

In accordance with another aspect of the present disclosure, the roller may include a rim disposed between the first frame and the roller and formed at the first end of the roller, and a plurality of ribs disposed along an outer circumferential surface of the rim, and the stopper may include a rod movable in a direction toward the roller from the door in the casing, and a fork disposed between the rod and the rim and coupled to the rod, the fork may be inserted between a rib among the plurality of ribs when the rod is moved toward the roller from the door.

In accordance with another aspect of the present disclosure, the door may include a pusher configured to project from the casing, and the side brake may be coupled to the rod and may further include a button disposed between the casing and the pusher to define a portion of an outer surface of the casing, the pusher contacts with the button when the door is closed.

In accordance with another aspect of the present disclosure, the fork may include a cutout groove formed at an end of the fork, and at least one of the plurality of ribs may be inserted into the cutout groove in the fork when the door is closed.

In accordance with another aspect of the present disclosure, the side brake may further include an elastic member configured to allow the rod to pass therethrough, the elastic member may be supported at an upper end of the elastic member by the button and at a lower end of the elastic member by the casing.

In accordance with another aspect of the present disclosure, the door may include a storage case pivotably coupled to the first frame and to the second frame and for receiving at least one control board, and a cover coupled to the storage case to cover the at least one control board.

In accordance with another aspect of the present disclosure, the door may further include a first door shaft extending longitudinally along a side of the storage case and comprising a first end coupled to a first shaft coupler and a second end rotatably coupled to the first frame, wherein the first shaft coupler is formed at the side of the storage case, and a second door shaft extending longitudinally along the side of the storage case and comprising a first end coupled to a second shaft coupler and a second end rotatably coupled to the second frame, the second shaft coupler may be formed at the side of the storage case.

In accordance with another aspect of the present disclosure, the first and second shaft couplers may be positioned between the first door shaft and the second door shaft.

In accordance with another aspect of the present disclosure, the display device may further include a module cover extending in the longitudinal direction of the roller, the module cover may include a plurality of segments which are arranged in a vertical direction of the flexible display panel, the flexible display panel and the module cover may be wound around or unwound from the roller.

In accordance with another aspect of the present disclosure, the flexible display panel may be lowered while being unwound from the roller and may be raised while being wound around the roller.

The effects of the display device according to the present disclosure will be described as follows.

According to at least one embodiment of the present disclosure, it is possible to ensure structural rigidity for preventing drooping of the display device.

According to at least one embodiment of the present disclosure, it is possible to ensure structural rigidity for preventing twisting of the display device.

According to at least one embodiment of the present disclosure, it is possible to provide a structure for opening and closing the display device.

According to at least one embodiment of the present disclosure, it is possible to prevent drooping of the door of the display device.

According to at least one embodiment of the present disclosure, it is possible to provide a structure for holding the roller of the display device.

Certain embodiments or other embodiments of the disclosure described above are not mutually exclusive or distinct from each other. Any or all elements of the embodiments of the disclosure described above may be combined with each other in configuration or function.

For example, a configuration "A" described in one embodiment of the disclosure and the drawings and a configuration "B" described in another embodiment of the disclosure and the drawings may be combined with each other. That is, even if the combination between the configurations is not directly described, the combination is possible except in the case where it is described that the combination is impossible.

Although embodiments have been described with reference to a number of illustrative embodiments thereof, it should be understood that numerous other modifications and embodiments that fall within the scope of the principles of this disclosure can be devised by those skilled in the art. More particularly, various variations and modifications are possible in the component parts and/or arrangements within the scope of the disclosure, the drawings and the appended claims. In addition to variations and modifications in the component parts and/or arrangements, alternative uses will also be apparent to those skilled in the art.

What is claimed is:

1. A display device comprising:
    a flexible display panel;
    a roller extending in a longitudinal direction, wherein the flexible display panel is wound around or unwound from the roller, wherein the roller comprises: a rim disposed between a first frame and the roller and formed at a first end of the roller, and a plurality of ribs disposed along an outer circumferential surface of the rim;
    the first frame coupled with the first end of the roller;
    a second frame coupled with a second end of the roller and disposed opposite to the first frame with respect to the roller, wherein the roller is rotatable at the first frame and the second frame; and
    a side brake adjacent to the roller to restrict rotation of the roller, wherein the side brake comprises a casing coupled to the first frame, and a stopper disposed in the casing and movable toward the roller,
    wherein the stopper comprises: a rod movable in a direction toward the roller in the casing, and a fork disposed between the rod and the rim and coupled to the rod, wherein the fork is inserted between a rib among the plurality of ribs when the rod is moved toward the roller.

2. The display device according to claim 1, further comprising a door disposed adjacent to an end of the flexible display panel unwound from the roller and coupled to the first frame and the second frame,
    wherein the door comprises a pusher configured to project from the casing, and
    wherein the side brake is coupled to the rod and further comprises a button disposed between the casing and the pusher to define a portion of an outer surface of the casing, wherein the pusher is in contact with the button when the door is closed.

3. The display device according to claim 2, wherein the fork comprises a cutout groove formed at an end of the fork, and wherein at least one of the plurality of ribs is inserted into the cutout groove in the fork when the door is closed.

4. The display device according to claim 3, wherein the side brake further comprises an elastic member configured to allow the rod to pass therethrough, wherein the elastic member is supported at an upper end of the elastic member by the button and at a lower end of the elastic member by the casing.

5. The display device according to claim 2, wherein the door comprises:
    a storage case pivotably coupled to the first frame and to the second frame and for receiving at least one control board; and
    a cover coupled to the storage case to cover the at least one control board.

6. The display device according to claim 5, wherein the door further comprises:

a first door shaft extending longitudinally along a side of the storage case and comprising a first end coupled to a first shaft coupler and a second end rotatably coupled to the first frame, wherein the first shaft coupler is formed at the side of the storage case; and a second door shaft extending longitudinally along the side of the storage case and comprising a first end coupled to a second shaft coupler and a second end rotatably coupled to the second frame, wherein the second shaft coupler is formed at the side of the storage case.

7. The display device according to claim 6, wherein the first and second shaft couplers are positioned between the first door shaft and the second door shaft.

8. The display device according to claim 1, further comprising a module cover extending in the longitudinal direction of the roller, wherein the module cover comprises a plurality of segments which are arranged in a vertical direction of the flexible display panel, wherein the flexible display panel and the module cover are wound around or unwound from the roller.

9. The display device according to claim 1, wherein the flexible display panel is lowered while being unwound from the roller and is raised while being wound around the roller.

10. The display device according to claim 2, wherein the side brake disposed between the door and the roller, wherein the side brake is adjacent to the first frame when the door is closed, and wherein the side brake restricts rotation of the roller.

11. The display device according to claim 2, wherein the casing disposed between the door and the roller, wherein the stopper is movable from door toward the roller, and wherein the stopper is moved vertically in the casing from the door to restrict rotation of the roller when the door is closed.

* * * * *